(12) United States Patent
Lee et al.

(10) Patent No.: US 8,176,322 B2
(45) Date of Patent: May 8, 2012

(54) APPARATUS AND METHOD FOR MOVING AND COPYING RIGHTS OBJECTS BETWEEN DEVICE AND PORTABLE STORAGE DEVICE

(75) Inventors: Byung-rae Lee, Yongin-si (KR); Tae-sung Kim, Seoul (KR); Kyung-im Jung, Seongnam-si (KR); Yun-sang Oh, Seoul (KR); Shin-han Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1371 days.

(21) Appl. No.: 11/085,480

(22) Filed: Mar. 22, 2005

(65) Prior Publication Data

US 2005/0210249 A1    Sep. 22, 2005

Related U.S. Application Data

(60) Provisional application No. 60/575,757, filed on Jun. 1, 2004.

(30) Foreign Application Priority Data

| Mar. 22, 2004 | (KR) | 10-2004-0019443 |
| Mar. 29, 2004 | (KR) | 10-2004-0021307 |
| May 31, 2004 | (KR) | 10-2004-0039381 |

(51) Int. Cl.
*H04L 9/00* (2006.01)

(52) U.S. Cl. ............ 713/168; 380/201; 726/26; 726/31; 726/2; 705/50; 705/57

(58) Field of Classification Search ............ 713/1, 2, 713/188, 194, 168; 380/200, 201, 255, 277; 726/2, 26, 31; 705/50, 57
See application file for complete search history.

(56) References Cited

U.S. PATENT DOCUMENTS

| 5,602,918 | A |   | 2/1997  | Chen et al. |
| 5,677,953 | A |   | 10/1997 | Dolphin |
| 6,009,177 | A | * | 12/1999 | Sudia ............................ 713/191 |
| 6,078,928 | A | * | 6/2000  | Schnase et al. ............ 707/104.1 |
| 6,128,740 | A | * | 10/2000 | Curry et al. .................... 713/158 |
| 6,592,032 | B1 | * | 7/2003 | Takaragi et al. .............. 235/382 |
| 6,697,944 | B1 | * | 2/2004 | Jones et al. .................... 713/168 |

(Continued)

FOREIGN PATENT DOCUMENTS

EP          1045388 A1    10/2000

(Continued)

OTHER PUBLICATIONS

Canadian Office Action, dated Aug. 20, 2010, issued in Application No. 2,560,577, English.

(Continued)

*Primary Examiner* — Saleh Najjar
*Assistant Examiner* — Joseph Pan
(74) *Attorney, Agent, or Firm* — Sughrue Mion, PLLC

(57) ABSTRACT

A method and apparatus for copying or moving a rights object having right information regarding digital contents between a device and a portable storage device to copy or move the digital contents there between are provided. According to the method and apparatus, the digital works can be prevented from being recklessly and randomly copied and moved, and therefore, copyright can be protected. In addition, data loss or unauthorized access can be prevented.

28 Claims, 41 Drawing Sheets

U.S. PATENT DOCUMENTS

| | | | |
|---|---|---|---|
| 6,970,565 B1* | 11/2005 | Rindsberg | 380/270 |
| 7,175,078 B2* | 2/2007 | Ban et al. | 235/380 |
| 7,203,966 B2* | 4/2007 | Abburi et al. | 726/29 |
| 7,343,012 B2* | 3/2008 | Kudo et al. | 380/201 |
| 2002/0034302 A1* | 3/2002 | Moriai et al. | 380/270 |
| 2002/0071553 A1 | 6/2002 | Shirai et al. | |
| 2002/0114462 A1 | 8/2002 | Kudo et al. | |
| 2002/0136405 A1* | 9/2002 | Hori | 380/203 |
| 2002/0156737 A1 | 10/2002 | Kahn et al. | |
| 2003/0048907 A1* | 3/2003 | Nakahara et al. | 380/277 |
| 2004/0073787 A1* | 4/2004 | Ban et al. | 713/159 |
| 2004/0168056 A1* | 8/2004 | Dillaway et al. | 713/156 |
| 2004/0249993 A1* | 12/2004 | Hori et al. | 710/20 |
| 2005/0060549 A1* | 3/2005 | England et al. | 713/175 |
| 2005/0071280 A1* | 3/2005 | Irwin et al. | 705/59 |
| 2005/0120205 A1* | 6/2005 | Umezawa et al. | 713/156 |
| 2006/0117090 A1* | 6/2006 | Schellingerhout et al. | 709/217 |

FOREIGN PATENT DOCUMENTS

| | | |
|---|---|---|
| JP | 11-328033 A | 11/1999 |
| JP | 2000-124890 A | 4/2000 |
| JP | 2001-257670 A | 9/2001 |
| JP | 2002-15147 A | 1/2002 |
| JP | 2002-319270 A | 10/2002 |
| JP | 2002-353952 A | 12/2002 |
| JP | 2003-99329 A | 4/2003 |
| JP | 2003-101526 A | 4/2003 |
| JP | 2004-23456 A | 1/2004 |
| JP | 2004-54988 A | 2/2004 |
| KR | 2001-0106325 A | 11/2001 |
| KR | 10-2004-0085819 A | 10/2004 |
| WO | WO 99/52077 A1 | 10/1999 |
| WO | WO 01/16821 A2 | 3/2001 |
| WO | WO 02/101491 A2 | 12/2002 |
| WO | WO 02/101493 A2 | 12/2002 |

OTHER PUBLICATIONS

Office Action dated Jun. 15, 2011, issued by the Canadian Intellectual Property Office in counterpart Canadian application No. 2,560,577.
"Mobile DRM" Based on OMA 1.0, Dec. 4, 2003, DigiCaps Technical Research Center, Seung-heun OH.
"Mobile DRM White Paper" by DigiCaps, Dec. 29, 2003.
Communication issued on Dec. 8, 2011 by the Canadian Intellectual Property Office in the corresponding Canadian Patent Application No. 2560474.

* cited by examiner

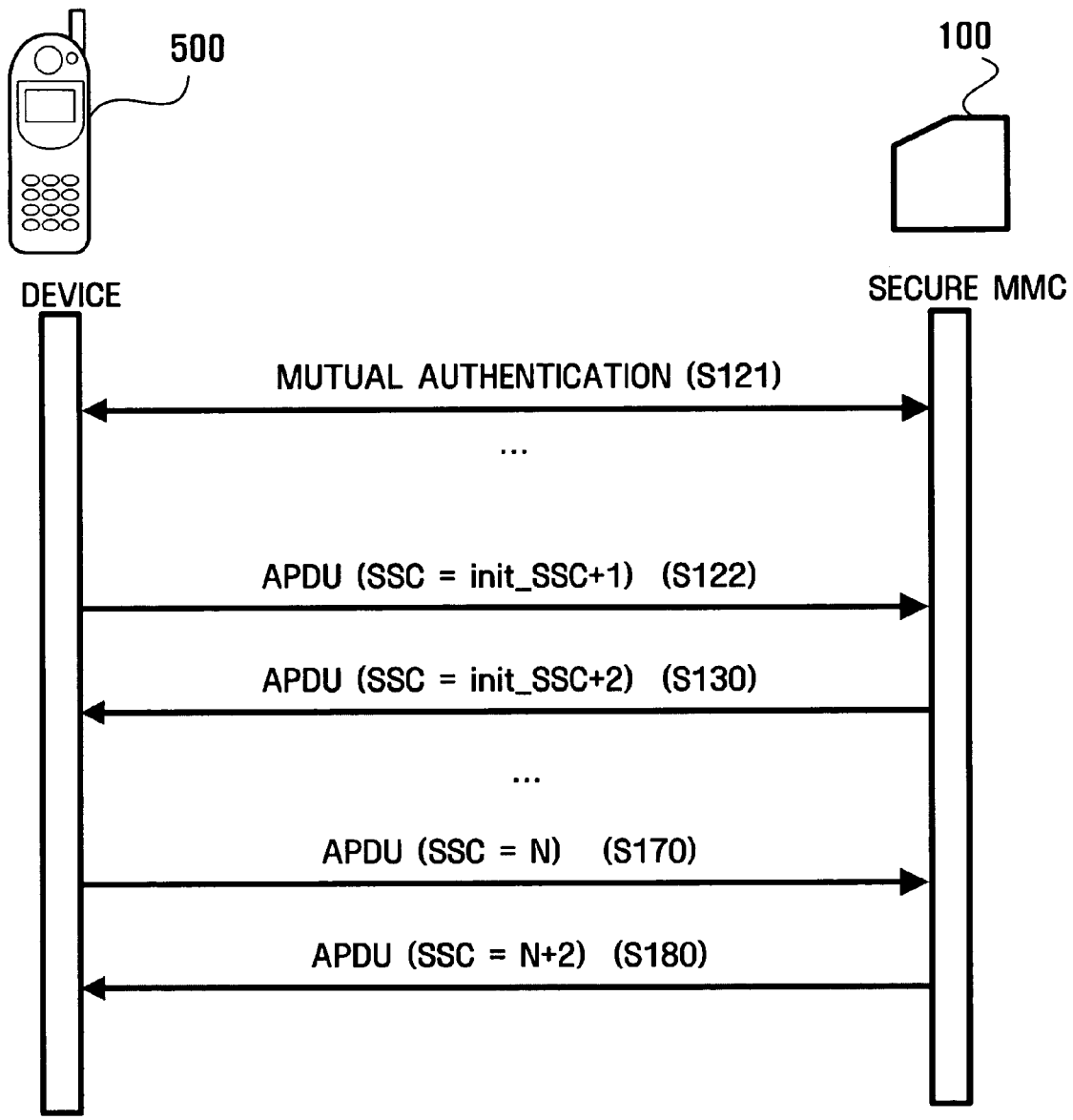

FIG. 5A

| | | | |
|---|---|---|---|
| Move | DEVICE -> SECURE MMC | SET_MOVE_RO | MOVE RO FROM DEVICE TO SECURE MMC  10 |
| | | GET_CONFIRM | |
| | SECURE MMC-> DEVICE | SET_SELECT_RO | MOVE RO FROM SECURE MMC TO DEVICE  20 |
| | | GET_MOVE_RO | |
| | | SET_CONFIRM | |
| Copy | DEVICE -> SECURE MMC | SET_COPY_RO | COPY RO FROM DEVICE TO SECURE MMC  30 |
| | | GET_CONFIRM | |
| | SECURE MMC-> DEVICE | SET_SELECT_RO | COPY RO FROM SECURE MMC TO DEVICE  40 |
| | | GET_COPY_RO | |
| | | SET_CONFIRM | |

FIG. 5B

| PARAMETER | DESCRIPTION |
|---|---|
| ROType | DETERMINES TYPE OF RO<br>0x00: General RO<br>0x01: Parent RO (PRO) in subscription model<br>0x02: Child RO (CRO) in subscription model |
| SMRF | RO DATA FORMAT OF SECURE MMC CONTAINS ALL INFORMATION REGARDING RO |
| RID | IDENTIFIER OF RO. FORMAT IS "RID:xxx" (WHERE QUOTATION MARKS ARE EXCLUDED). |
| ACK | RESULTANT VALUE<br>0: SUCCESS 1: FAILURE |
| ORO | Original Right Object(ORO), USABLE AFTERWARDS |

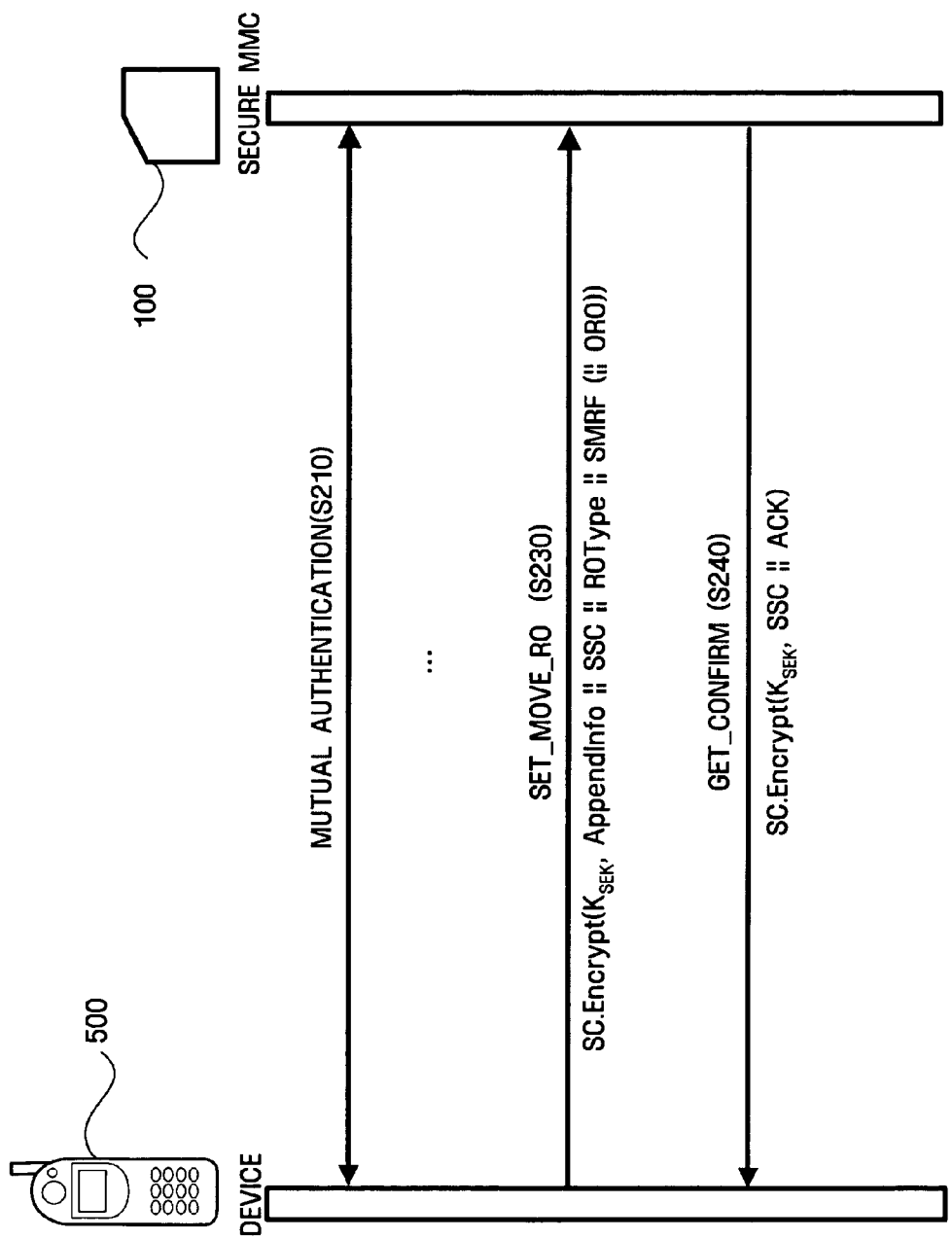

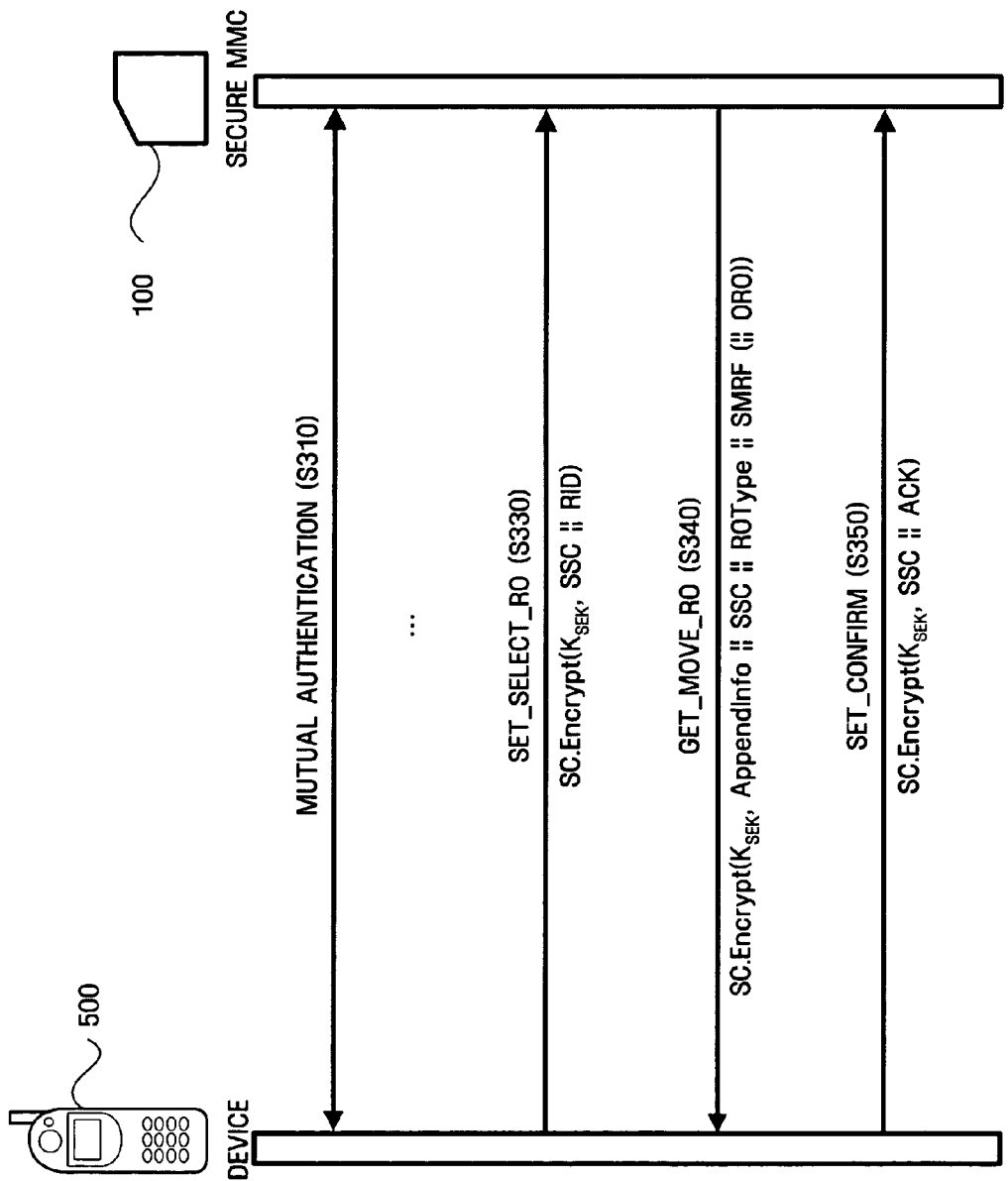

FIG. 18A

```
Count = 3

Datetime
    Start = 2004-03-12T10:23:00
    End = 2004-04-12T21:23:00
```

CONSTRAINT INFORMATION BEFORE
RO IS COPIED

FIG. 18B

```
Count = 2

Datetime
    Start = 2004-03-12T10:23:00
    End = 2004-04-12T21:23:00
```

CONSTRAINT INFORMATION
AFTER RO IS COPIED

FIG. 19

<!ELEMENT COPY_CONTROL_INFO (TIME, COUNT)>

<!ELEMENT TIME (START, END)>

<!ELEMENT START (#PCDATA)>

<!ELEMENT END (#PCDATA)>

<!ELEMENT COUNT(MYGEN, NUM, ACCEPT_GEN, COPYGEN_INFO)>

<!ELEMENT MYGEN (#PCDATA)>

<!ELEMENT ACCEPT_GEN (#PCDATA)>

<!ELEMENT NUM (#PCDATA)>

<!ELEMENT COPYGEN_INFO (GEN, GENNUM)>

<!ELEMENT GEN (#PCDATA)>

<!ELEMENT GENNUM (#PCDATA)>

FIG. 20A

```
<COPY_CONTROL_INFO>
    <TIME>
        <START>2004-03-12T10:23:00</START>
        <END>2004-04-12T21:23:00</END>
    </TIME>
    <COUNT>
        <MYGEN>1</MYGEN>
        <ACCEPT_GEN >3</ ACCEPT_GEN >
        <NUM>5</NUM>
        <COPYGEN_INFO>
            <GEN>1</GEN>
            <GENNUM>5</GENNUM>
            <GEN>2</GEN>
            <GENNUM>4</GENNUM>
            <GEN>3</GEN>
            <GENNUM>2</GENNUM>
        </COPYGEN_INFO>
    </COUNT>
</COPY_CONTROL_INFO>
```

CONSTRAINT INFORMATION FOR
ORIGINAL RO BEFORE COPY

FIG. 20B

```
<COPY_CONTROL_INFO>
    <TIME>
        <START>2004-03-12T10:23:00</START>
        <END>2004-04-12T21:23:00</END>
    </TIME>
    <COUNT>
        <MYGEN>1</MYGEN>
        <ACCEPT_GEN >3</ ACCEPT_GEN >
        <NUM>4</NUM>
        <COPYGEN_INFO>
            <GEN>1</GEN>
            <GENNUM>4</GENNUM>
            <GEN>2</GEN>
            <GENNUM>4</GENNUM>
            <GEN>3</GEN>
            <GENNUM>2</GENNUM>
        </COPYGEN_INFO>
    </COUNT>
</COPY_CONTROL_INFO>
```

CONSTRAINT INFORMATION FOR
ORIGINAL RO AFTER COPY

FIG. 20C

```
<COPY_CONTROL_INFO>
    <TIME>
        <START>2004-03-12T10:23:00</START>
        <END>2004-04-12T21:23:00</END>
    </TIME>
    <COUNT>
        <MYGEN>2</MYGEN>
        <ACCEPT_GEN >3</ ACCEPT_GEN >
        <NUM>4</NUM>
        <COPYGEN_INFO>
            <GEN>1</GEN>
            <GENNUM>4</GENNUM>
            <GEN>2</GEN>
            <GENNUM>4</GENNUM>
            <GEN>3</GEN>
            <GENNUM>2</GENNUM>
        </COPYGEN_INFO>
    </COUNT>
</COPY_CONTROL_INFO>
```

CONSTRAINT INFORMATION FOR COPIED RO
AFTER COPY

FIG. 23A

STRUCTURE OF SET_MOVE_RO COMMAND

INPUT COMMAND

| CLA  |                                                            |
|------|------------------------------------------------------------|
| INS  |                                                            |
| P1   |                                                            |
| P2   |                                                            |
| Lc   | FFh                                                        |
| Data | SC.Encrypt($K_{SEK}$, AppendInfo ¦¦ SSC ¦¦ SMRF (¦¦ ORO))  |
| Le   | 00h                                                        |

FIG. 23B

STRUCTURE OF SET_MOVE_RO COMMAND

OUTPUT RESPONSE

| DATA     |     |                                        |
|----------|-----|----------------------------------------|
| Status Word || DESCRIPTION                           |
| SW1 | SW2 |                                         |
| 90h | 00h | INSTRUCTION HAS BEEN SUCCESSFULLY EXECUTED |
| 6Dh | 00h | UNKNOWN TAG                             |
| 6Bh | 00h | PARAMETER HAS ERROR                     |
| 69h | 85h | AUTHENTICATION IS NEEDED                |

FIG. 24A

STRUCTURE OF GET_CONFIRM COMMAND

INPUT COMMAND

| CLA  |     |
|------|-----|
| INS  |     |
| P1   |     |
| P2   |     |
| Lc   | 00h |
| Data |     |
| Le   | FFh |

FIG. 24B

STRUCTURE OF GET_CONFIRM COMMAND

OUTPUT RESPONSE

| DATA | | SC.Encrypt($K_{SEK}$, SSC ‖ ACK) |
|------|------|------|
| Status Word || DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |

FIG. 25A

STRUCTURE OF SET_SELECT_RO COMMAND

INPUT COMMAND

| CLA | |
|---|---|
| INS | |
| P1 | |
| P2 | |
| Lc | FFh |
| Data | SC.Encrypt($K_{SEK}$; SSC ∥ RID) |
| Le | 00h |

FIG. 25B

STRUCTURE OF SET_SELECT_RO COMMAND

OUTPUT RESPONSE

| DATA | | |
|---|---|---|
| Status Word | | DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |

FIG. 26A

STRUCTURE OF GET_MOVE_RO COMMAND

INPUT COMMAND

| CLA  |     |
|------|-----|
| INS  |     |
| P1   |     |
| P2   |     |
| Lc   | 00h |
| Data |     |
| Le   | FFh |

FIG. 26B

STRUCTURE OF GET_MOVE_RO COMMAND

OUTPUT RESPONSE

| DATA | | SC.Encrypt($K_{SEK}$, AppendInfo ¦¦ SSC ¦¦ SMRF (¦¦ ORO)) |
|------|------|---|
| Status Word | | DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |

FIG. 27A

STRUCTURE OF SET_CONFIRM COMMAND

INPUT COMMAND

| CLA | |
|---|---|
| INS | |
| P1 | |
| P2 | |
| Lc | FFh |
| Data | SC.Encrypt($K_{SEK}$, SSC ∥ ACK) |
| Le | 00h |

FIG. 27B

STRUCTURE OF SET_CONFIRM COMMAND

OUTPUT RESPONSE

| DATA | | |
|---|---|---|
| Status Word | | DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |

FIG. 28A

STRUCTURE OF SET_COPY_RO COMMAND

INPUT COMMAND

| CLA | |
|---|---|
| INS | |
| P1 | |
| P2 | |
| Lc | FFh |
| Data | SC.Encrypt($K_{SEK}$, SSC ∥ SMRF) |
| Le | 00h |

FIG. 28B

STRUCTURE OF SET_COPY_RO COMMAND
OUTPUT RESPONSE

| DATA | | |
|---|---|---|
| Status Word | | DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |
| 69h | 85h | AUTHENTICATION IS NEEDED |

FIG. 29A

STRUCTURE OF GET_COPY_RO COMMAND

INPUT COMMAND

| CLA | |
|---|---|
| INS | |
| P1 | |
| P2 | |
| Lc | 00h |
| Data | |
| Le | FFh |

FIG. 29B

STRUCTURE OF GET_COPY_RO COMMAND

OUTPUT RESPONSE

| DATA | SC.Encrypt(KSEK, SSC ‖ SMRF) | |
|---|---|---|
| Status Word | | DESCRIPTION |
| SW1 | SW2 | |
| 90h | 00h | INSTRUCTION HAS BEEN SUCCESSFULLY EXECUTED |
| 6Dh | 00h | UNKNOWN TAG |
| 6Bh | 00h | PARAMETER HAS ERROR |

FIG. 30A

SET_MOVE_RO

INSTRUCTION

| CLA | INS | P1 | P2 | Lc | Data Field | Le |
|-----|-----|-----|-----|-----|------------|-----|
| 00 | 74 | 02 | 01 | FF | TLV | 00 |

FIG. 30B

SET_MOVE_RO

INSTRUCTION PARAMETERS

| P1 | P2 | Description |
|-----|-----|-------------|
| 02 | 01 | -P1 : INSTRUCTION TO MOVE RO<br>-P2 : SETTING RO TO BE MOVED |

FIG. 30C

SET_MOVE_RO

INSTRUCTION PARAMETERS

| | | Description |
|---|---|-------------|
| Lc | | FF |
| Data Field | T | 0x74 |
| | L | LENGTH OF V-FIELD |
| | V | E(K, RO) |
| Le | | 00 |

FIG. 30D

SET_MOVE_RO
RESPONSE

| Data field | Description |
|---|---|
| T | None |
| L | None |
| V | None |

FIG. 30E

SET_MOVE_RO
RESPONSE

| Status Word | | Description |
|---|---|---|
| SW1 | SW2 | |
| 90 | 00 | SUCCESSFUL TRANSMISSION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |
| 63 | 00 | VERIFICATION FAILURE |
| | CX | COUNTER ("X" INDICATES AVAILABLE NUMBER OF ATTEMPTS IN CASE OF VERIFICATION FAILURE) |

FIG. 31A

GET_MOVE_RO

INSTRUCTION

| CLA | INS | P1 | P2 | Lc | Data Field | Le |
|---|---|---|---|---|---|---|
| 00 | 74 | 02 | 02 | 00 | None | FF |

FIG. 31B

GET_MOVE_RO

INSTRUCTION PARAMETERS

| P1 | P2 | Description |
|---|---|---|
| 02 | 02 | -P1 : INSTRUCTION TO MOVE RO<br>-P2 : REQUESTING TO MOVE RO |

FIG. 31C

GET_MOVE_RO

INSTRUCTION PARAMETERS

| | | Description |
|---|---|---|
| Lc | | 00 |
| Data Field | T | None |
| | L | None |
| | V | None |
| Le | | FF |

FIG. 31D

GET_MOVE_RO

RESPONSE

| Data field | Description |
|---|---|
| T | 0x74 |
| L | LENGTH OF V-FIELD |
| V | E(K,RO) |

FIG. 31E

GET_MOVE_RO

RESPONSE

| Status Word | | Description |
|---|---|---|
| SW1 | SW2 | |
| 90 | 00 | SUCCESSFUL TRANSMISSION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |

FIG. 32A

SET_COPY_RO

INSTRUCTION

| CLA | INS | P1 | P2 | Lc | Data Field | Le |
|-----|-----|----|----|----|-----------|-----|
| 00 | 74 | 01 | 01 | FF | TLV | 00 |

FIG. 32B

SET_COPY_RO

INSTRUCTION PARAMETERS

| P1 | P2 | Description |
|----|----|-------------|
| 01 | 01 | -P1 : INSTRUCTION TO COPY RO<br>-P2 : COPYING RO FROM DEVICE TO PORTABLE STORAGE DEVICE |

FIG. 32C

SET_COPY_RO

INSTRUCTION PARAMETERS

| | | Description |
|---|---|-------------|
| Lc | | FF |
| Data Field | T | 0x74 |
| | L | LENGTH OF V-FIELD |
| | V | E(K, RO) |
| Le | | 00 |

FIG. 32D

SET_COPY_RO
RESPONSE

| Data field | Description |
|---|---|
| T | None |
| L | None |
| V | None |

FIG. 32E

SET_COPY_RO
RESPONSE

| Status Word | | Description |
|---|---|---|
| SW1 | SW2 | |
| 90 | 00 | SUCCESSFUL TRANSMISSION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |
| 63 | 00 | VERIFICATION FAILURE |
| | CX | COUNTER ("X" INDICATES AVAILABLE NUMBER OF ATTEMPTS IN CASE OF VERIFICATION FAILURE |

FIG. 33A

GET_COPY_RO

INSTRUCTION

| CLA | INS | P1 | P2 | Lc | Data Field | Le |
|-----|-----|----|----|----|------------|----|
| 00  | 74  | 01 | 02 | 00 | None       | FF |

FIG. 33B

GET_COPY_RO
INSTRUCTION PARAMETERS

| P1 | P2 | Description |
|----|----|-------------|
| 01 | 02 | -P1 : INSTRUCTION TO COPY RO<br>-P2 : COPYING RO FROM PORTABLE STORAGE DEVICE TO DEVICE |

FIG. 33C

GET_COPY_RO
INSTRUCTION PARAMETERS

|  |  | Description |
|--|--|-------------|
| Lc | | 00 |
| Data Field | T | None |
|  | L | None |
|  | V | None |
| Le | | FF |

FIG. 33D

GET_COPY_RO
RESPONSE

| Data field | Description |
|---|---|
| T | 0x74 |
| L | LENGTH OF V-FIELD |
| V | E(K,RO) |

FIG. 33E

GET_COPY_RO
RESPONSE

| Status Word | | Description |
|---|---|---|
| SW1 | SW2 | |
| 90 | 00 | SUCCESSFUL TRANSMISSION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |

APPARATUS AND METHOD FOR MOVING AND COPYING RIGHTS OBJECTS BETWEEN DEVICE AND PORTABLE STORAGE DEVICE

CROSS-REFERENCE TO RELATED APPLICATIONS

This application claims priority from Korean Patent Application No. 10-2004-0019443 filed on Mar. 22, 2004 in the Korean Intellectual Property Office, Korean Patent Application No. 10-2004-0021307 filed on Mar. 29, 2004 in the Korean Intellectual Property Office, Korean Patent Application No. 10-2004-0039381 filed on May 31, 2004 in the Korean Intellectual Property Office, and U.S. Provisional Patent Application No. 60/575,757 filed on Jun. 1, 2004 in the United States Patent and Trademark Office, the disclosures of which are incorporated herein by reference in their entirety.

BACKGROUND OF THE INVENTION

1. Field of the Invention

The present invention relates to a method and apparatus for copying or moving digital contents between a device and a portable storage device, and more particularly, to a method and apparatus for copying or moving rights object having right information regarding digital contents between a device and a portable storage device without an error.

2. Description of the Related Art

Recently, digital rights management (DRM) has been actively researched and developed. Commercial services using DRM have already been used or will be used. DRM needs to be used because of the following various characteristics of digital content.

That is to say, unlike analog data, digital contents can be copied without loss and can be easily reused, processed, and distributed, and only a small amount of cost is needed to copy and distribute the digital content.

However, a large amount of cost, labor, and time are needed to produce the digital contents. Thus, when the digital contents is copied and distributed without permission, a producer of the digital contents may lose profit, and enthusiasm for creation may be discouraged. As a result, development of digital contents business may be hampered.

There have been several efforts to protect digital contents. Conventionally, digital contents protection has been concentrated on preventing non-permitted access to digital contents, permitting only people paid charges to access the digital content.

Thus, people who paid charges to the digital contents are allowed access to unencrypted digital contents while people who did not pay charges are not allowed access. In this case, when a person paid charges intentionally distributes the digital contents to other people, however, the people can use the digital contents without paying charges. To solve this program, DRM was introduced. In DRM, anyone is allowed to freely access encoded digital content, but a license referred to as a rights object is needed to decode and execute the digital content.

Accordingly, the digital contents can be more effectively protected by using DRM.

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is a portable storage device and stores multimedia data to be used for various types of digital equipment, overcoming limitations of conventional hard disks or compact disks. The MMC also includes an operation part that is not included in conventional storage media, thereby having ability to perform control. As a result, the MMC is suitable to accommodate various kinds of multimedia data in large capacities. Recently, a security function has been added to the MMC, thereby developing a secure MMC that secures digital contents during storage and transmission and protects copyright. With the development of the secure MMC, rights management on digital contents becomes possible in a storage device and digital equipment. Hereinafter, digital equipment such as a digital camera, a portable phone, a computer, and a digital camcorder will be generally referred to as a "device."

Currently, standard open mobile alliance (OMA) DRM is DRM defined by an OMA for the field of mobile technology. The OMA DRM has been suggested as standard DRM for data of digital contents downloaded to a mobile device such as a mobile phone. However, all digital data is not always moved or transmitted only from a server to a mobile phone. Digital data may be transmitted via a portable storage device. In addition, devices, e.g., digital cameras and computers, other than mobile devices usually transmit data via the portable storage device instead of using a mobile mode. Accordingly, development of DRM that covers technological characteristics of the OMA DRM and is suitable for portable storage devices is desired.

The concept of digital rights management (DRM) will be described with reference to FIG. 1. DRM relates to management of contents (hereafter, referred to as encrypted contents) protected using a method such as encryption or scrambling and rights objects allowing access to the encrypted contents.

Referring to FIG. 1, a DRM system includes user devices 110 and 150 wanting to access content protected by DRM, a contents issuer 120 issuing content, a rights issuer 130 issuing a rights object containing a right to access the content, and a certification authority 140 issuing a certificate.

In operation, the user device 110 can obtain desired contents from the contents issuer 120 in an encrypted format protected by DRM. The user device 110 can obtain a license to play the encrypted contents from a rights object received from the rights issuer 130. Then, the user device 110 can play the encrypted contents. Since encrypted contents can be circulated or distributed freely, the user device 110 can freely transmit the encrypted contents to the user device 150. The user device 150 needs the rights object to play the encrypted contents. The rights object can be obtained from the rights issuer 130. Meanwhile, the certification authority 140 issues a certificate indicating that the contents issuer 120 is authentic and the user devices 110 and 150 are authorized devices. The certificate may be embedded into devices used by the user devices 110 and 150 when the devices are manufactured and may be reissued by the certification authority 140 after a predetermined duration has expired.

DRM protects the profits of those producing or providing digital contents and thus may be helpful in activating the digital contents industry. Although a rights object or encrypted contents can be transferred between the user devices 110 and 150 using mobile devices, it is inconvenient as a practical matter. To easily move a rights object or encrypted content between devices, the efficient copying or moving of data between a device and a portable storage device acting as an intermediate between devices is desired. In addition, to prevent data copying or moving via a portable storage device from violating copyright, a method of managing copying and moving of a rights object is desired. More-over, a method of controlling a sequence of commands used to move a rights object is desired to prevent loss of information or addition of information by an unauthorized input.

SUMMARY OF THE INVENTION

The present invention provides an apparatus and method for moving and copying a rights object having information regarding a right to use digital contents to manage copyright on the digital content, thereby realizing efficient distribution of digital contents and efficient management of copyright on the digital contents.

The present invention also provides an apparatus and method for discriminately assigning a right to duplicate using control information over a move and copy of a rights object.

The present invention also provides an apparatus and method for allocating a sequence number to a move or copy of a rights object to prevent data loss and unauthorized access.

According to an aspect of the present invention, there is provided a method of moving a rights object from a device to a portable storage device, including converting the rights object into a format supported by the portable storage device, using the device, encrypting the converted rights object using the device, transmitting the encrypted rights object from the device to the portable storage device, and deactivating the rights object stored in the device after the transmitting of the encrypted rights object is completed.

According to another aspect of the present invention, there is provided a method of moving a rights object, including requesting a portable storage device to move the rights object using a device, receiving an encrypted rights object from the portable storage device, decrypting and storing the received rights object in the device, and deactivating the rights object stored in the portable storage device.

According to still another aspect of the present invention, there is provided a portable storage device including an interface unit which connects the portable storage device to a device, a control unit which converts a format of a rights object that is transmitted to the device or received from the device through the interface unit and deactivates the rights object that has been completely moved, and a symmetric-key encryption unit which encrypts or decrypts the rights object converted by the control unit.

According to a further aspect of the present invention, there is provided a device including an interface unit which connects the device to a portable storage device, a control unit which converts a format of a rights object that is transmitted to the portable storage device or received from the portable storage device through the interface unit and deactivates the rights object that has been completely moved, and a symmetric-key encryption unit which encrypts or decrypts the rights object converted by the control unit.

BRIEF DESCRIPTION OF THE DRAWINGS

The above and other aspects of the present invention will become more apparent by describing in detail exemplary embodiments thereof with reference to the attached drawings in which:

FIG. 4 is a flowchart of a procedure for applying a sequence number according to an exemplary embodiment of the present invention;

FIGS. 5A and 5B illustrate examples of instructions and parameters needed to move and copy a rights object (RO) according to an exemplary embodiment of the present invention;

FIG. 6 is a flowchart of a procedure for moving an RO from a device to a secure MMC according to an exemplary embodiment of the present invention;

FIG. 7 is a flowchart of a procedure for moving an RO from a secure MMC to a device according to an exemplary embodiment of the present invention;

FIGS. 18A and 18B illustrate an example of changes in constraint information having the structure illustrated in FIG. 17;

FIG. 19 illustrates a structure of constraint information according to another exemplary embodiment of the present invention;

FIGS. 20A, 20B and 20C illustrate an example of changes in constraint information having the structure illustrated in FIG. 19 when an RO is copied;

FIGS. 23A and 23B illustrate a structure of a SET_MOVE_RO command according to an exemplary embodiment of the present invention;

FIGS. 24A and 24B illustrate a structure of a GET_CONFIRM command according to an exemplary embodiment of the present invention;

FIGS. 25A and 25B illustrate a structure of a SET_SELECT_RO command according to an exemplary embodiment of the present invention;

FIGS. 26A and 26B illustrate a structure of a GET_MOVE_RO command according to an exemplary embodiment of the present invention;

FIGS. 27A and 27B illustrate a structure of a SET_CONFIRM command according to an exemplary embodiment of the present invention;

FIGS. 28A and 28B illustrate a structure of a SET_COPY_RO command according to an exemplary embodiment of the present invention;

FIGS. 29A and 29B illustrate a structure of a GET_COPY_RO command according to an exemplary embodiment of the present invention;

FIGS. 30A, 30B, 30C, 30D and 30E illustrate a structure of parameters of an instruction SET_MOVE_RO according to an exemplary embodiment of the present invention;

FIGS. 31A, 31B, 31C, 31D and 31E illustrate a structure of parameters of an instruction GET_MOVE_RO according to an exemplary embodiment of the present invention;

FIGS. 32A, 32B, 32C, 32D and 32E illustrate a structure of parameters of an instruction SET_COPY_RO according to an exemplary embodiment of the present invention; and FIGS. 33A, 33B, 33C, 33D and 33E illustrate a structure of parameters of an instruction GET_COPY_RO according to an exemplary embodiment of the present invention.

DETAILED DESCRIPTION OF THE EXEMPLARY EMBODIMENTS

Figure 1:
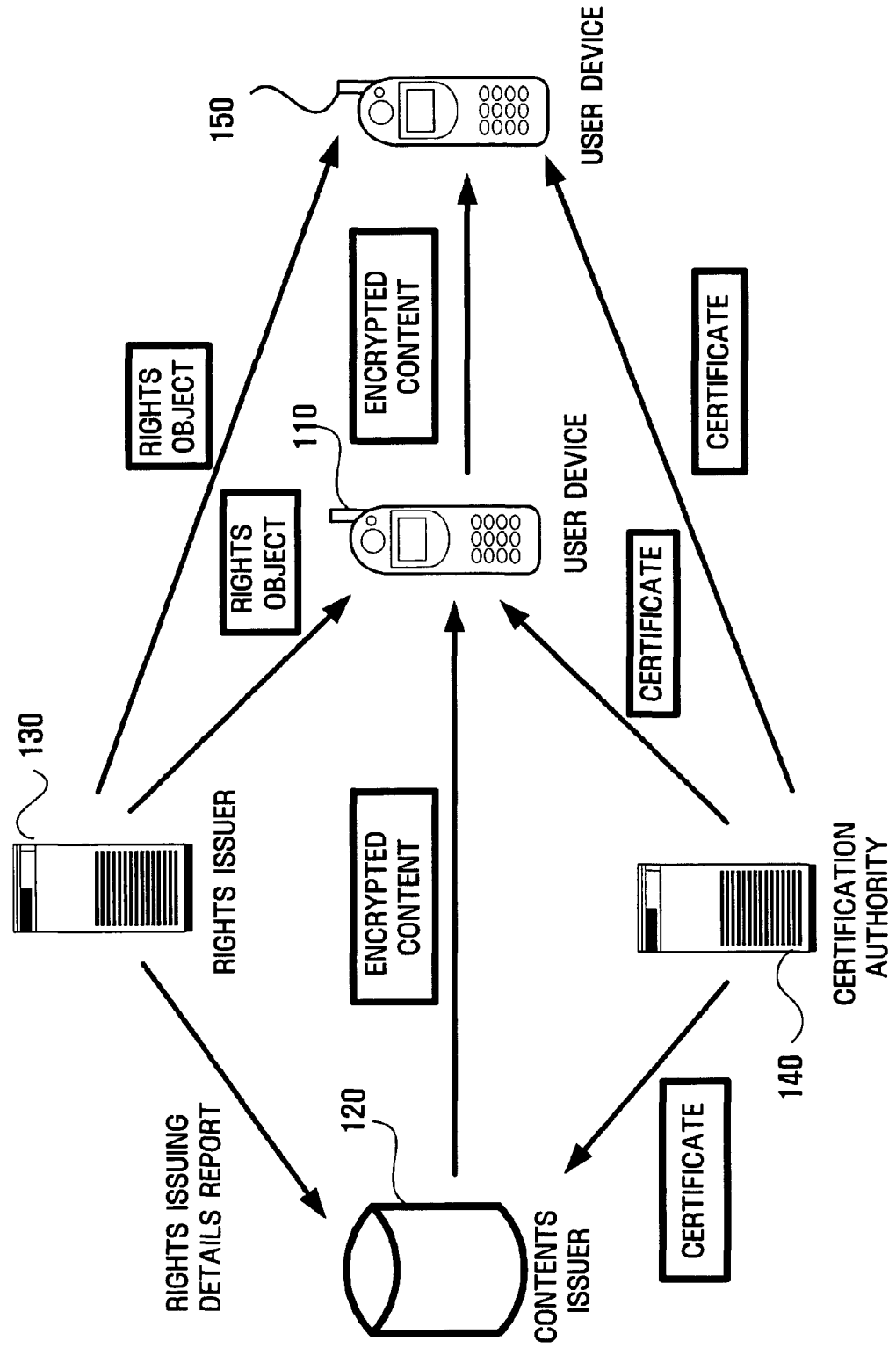
FIG. 1 is a conceptual diagram of digital rights management (DRM)

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In the present invention, devices generally indicate digital machineries such as digital cameras, mobile phones, computers, and laptops. Portable storage devices are storage devices such as secure multimedia cards (MMCs) that are portable and removable and include an operation unit and an interface for a device. Hereinafter, for clarity of the description, a secure MMC exemplifies a portable storage device. This is just because the secure MMC has been widely spread in the industry, and the present invention is not limited to the secure MMC.

Hereinafter, exemplary embodiments of the present invention will be described in detail with reference to the attached drawings. Before the detailed description is set forth, terms used in this specification will be described briefly. Description of terms is to be construed provided for a better understanding of the specification and terms that are not explicitly defined herein are not intended to limit the broad aspect of the invention.

Public-Key Cryptography

Public-key cryptography is referred to as an asymmetric cipher in which a key used for encryption is different from a key used for decryption. A public-key algorithm is open to the public, but it is impossible or difficult to decrypt original content with only a cryptographic algorithm, an encryption key, and ciphered text. Examples of a public-key cryptographic system include Diffie-Hellman cryptosystems, RSA cryptosystems, ElGamal cryptosystems, and elliptic curve cryptosystems. The public-key cryptography is about 100-1000 times slower than symmetric-key cryptography and is thus usually used for key exchange and digital signature not for encryption of content.

Symmetric-Key Cryptography

Symmetric-key cryptography is a symmetric cipher referred to as secret-key cryptography using the same key encryption and decryption. A data encryption standard (DES) is a most usual symmetric cipher. Recently, applications using an advanced encryption standard (AES) have increased.

Certificate

A certification authority certifies users of a public key with respect to a public-key cipher. A certificate is a message containing a public key and a person's identity information which are signed by the certification authority using a private key. Accordingly, the integrity of the certificate can be easily considered by applying the public key of the certification authority to the certificate, and therefore, attackers are prevented from modulating a user's public key.

Digital Signature

A digital signature is generated by a signer to indicate that a document has been written. Examples of a digital signature are an RSA digital signature, an ElGamal digital signature, a DSA digital signature, and a Schnorr digital signature. When the RSA digital signature is used, a sender encrypts a message with his/her private key and sends the encrypted message to a recipient. The recipient decrypts the encrypted message. In this case, it is proved that the message has been encrypted by the sender.

Random Number

A random number is a sequence of numbers or characters with random properties. Since it costs a lot to generate a complete random number, a pseudo-random number may be used.

Portable Storage Device

A portable storage device used in the present invention includes a non-volatile memory such as a flash memory which data can be written to, read from, and deleted from and which can be connected to a device. Examples of such portable storage device are smart media, memory sticks, compact flash (CF) cards, xD cards, and multimedia cards. Hereinafter, a secure MMC will be explained as a portable storage device.

Device

A device used in the present invention may be a portable or non-portable multimedia device.

Mutual Authentication

A device and a portable storage device perform authentication mutually. When a session key, i.e., a key used to encrypt data to be transferred using public-key cryptography, is shared by the device and the portable storage device for mutual authentication, the data transferred between the device and the portable storage device is encrypted using the session key.

Rights Object (RO)

A rights object (RO) has the content of a right to a digital work and defines a right to play, display, execute, print, export (i.e., copy or transfer), or inspect the digital work. To perform digital rights management (DRM) between a device and a portable storage device, it is necessary to use a RO having information regarding a right to digital content.

Move

The term "move" means transporting a digital object from one device to another device. Moving a digital object means moving the digital object as it is from one position to another position in a device or from the device to another device. After the move, the digital object is present solely without a duplicate.

Copy

The term "copy" means that another digital object which is the same as a digital object in a device is generated at a different position in the device or in another device. It also means that one or more digital objects having the same content or information as a digital object are generated. After the copy, two or more identical digital objects exist.

Constraint Information

Constraint information refers to constraints allowing a rights object (RO) to be copied or moved only under particular conditions. Since the constraint information controls copying and moving, it may be referred to as control information. Hereinafter, the term "control information" is used in the same conception as "constraint information."

Figure 2:
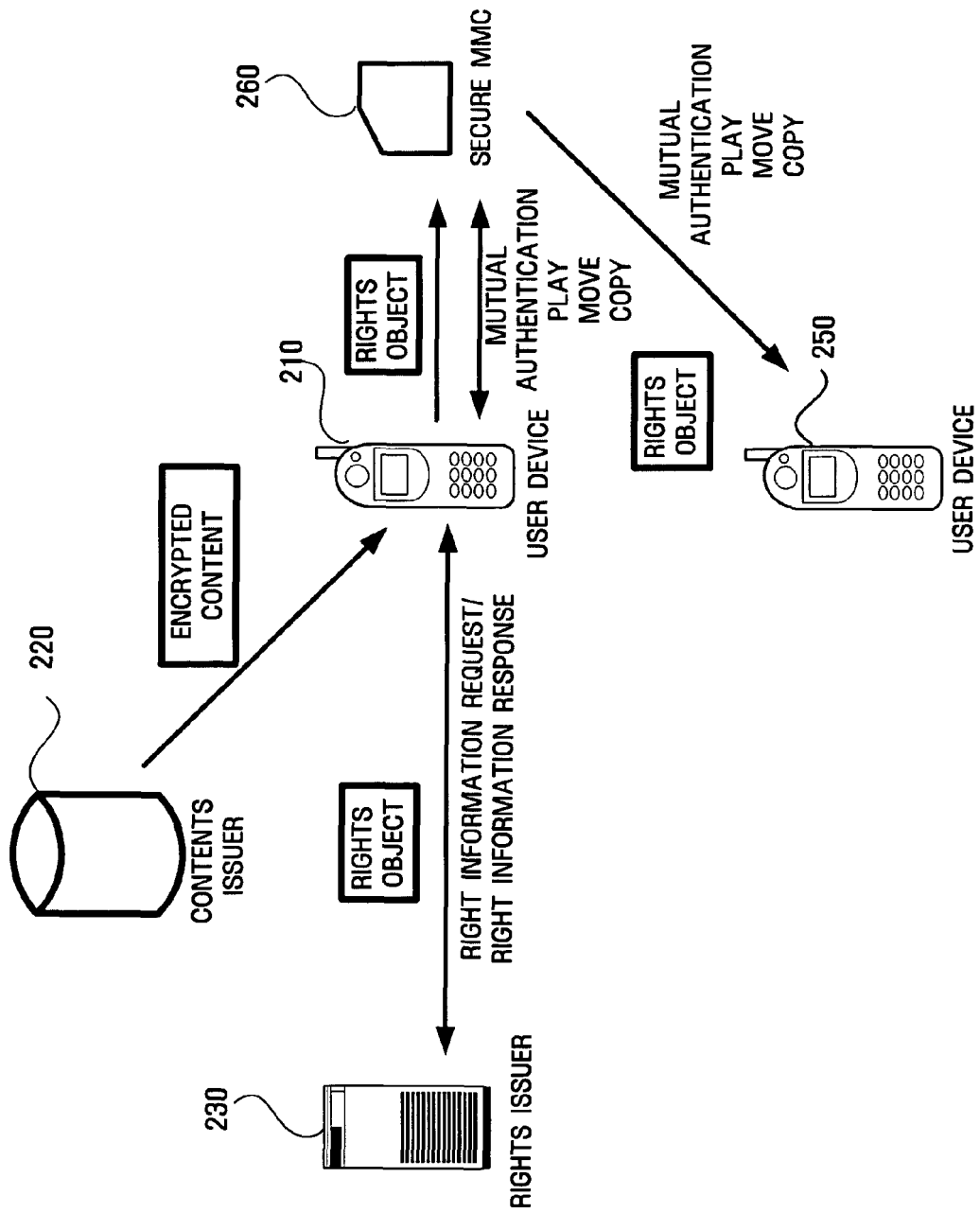
FIG. 2 is a schematic diagram illustrating elements related to DRM using a secure multimedia card (MMC)

FIG. 2 is a schematic diagram illustrating elements related to digital rights management (DRM) using a secure multimedia card (MMC).

A user device 210 can obtain encrypted content from a contents issuer 220. The encrypted content is content protected through DRM. To play the encrypted content, an RO for the encrypted content is needed. An RO contains a definition of rights to content, constraints to the rights, and rights to the RO itself. An example of the rights to the content may be a playback. Examples of the constraints may be the number of playbacks, a playback time, and playback duration. An example of the rights to the RO may be a move or a copy. In other words, an RO containing a right to move may be moved to another device or a secure MMC. An RO containing rights to copy may be copied to another device or a secure MMC. When the RO is moved, the original RO before the move is deactivated (i.e., the RO itself is deleted or a right contained in the RO is deleted). However, when the RO is copied, the original RO may be used in an activated state even after the copy.

After obtaining the encrypted content the user device 210 may request an RO from a rights issuer 230 to obtain a right to play. When the user device 210 receives the RO together with an RO response from the rights issuer 230, the user device 210 can play the encrypted content using the RO. Meanwhile, the user device 210 may transfer the RO to a user device 250 having a corresponding encrypted object through a portable storage device. The portable storage device may be a secure MMC 260 having a DRM function. In this case, the user device 210 performs mutual authentication with the secure MMC 260 and then moves the RO to the secure MMC 260. To play the encrypted content, the user device 210 requests a right to play from the secure MMC 260 and receives the rights to play, i.e., a content encryption key, from the secure MMC 260. The user device 210 can play the encrypted content using the content encryption key. Meanwhile, after performing mutual authentication with the user device 250, the secure MMC 260 can move the RO to the user device 250 or enable the user device 250 to play the encrypted content.

In exemplary embodiments of the present invention, mutual authentication between a device and a secure MMC is needed to enable the device to use the secure MMC. As a result of the mutual authentication, a session key is generated. The session key is a key shared by the device and the secure MMC and is valid during access. While the access is maintained, information transmitted between the device and the secure MMC is encrypted using the session key for secure transmission. The mutual authentication will be described in detail with reference to FIG. 3.

Figure 3:
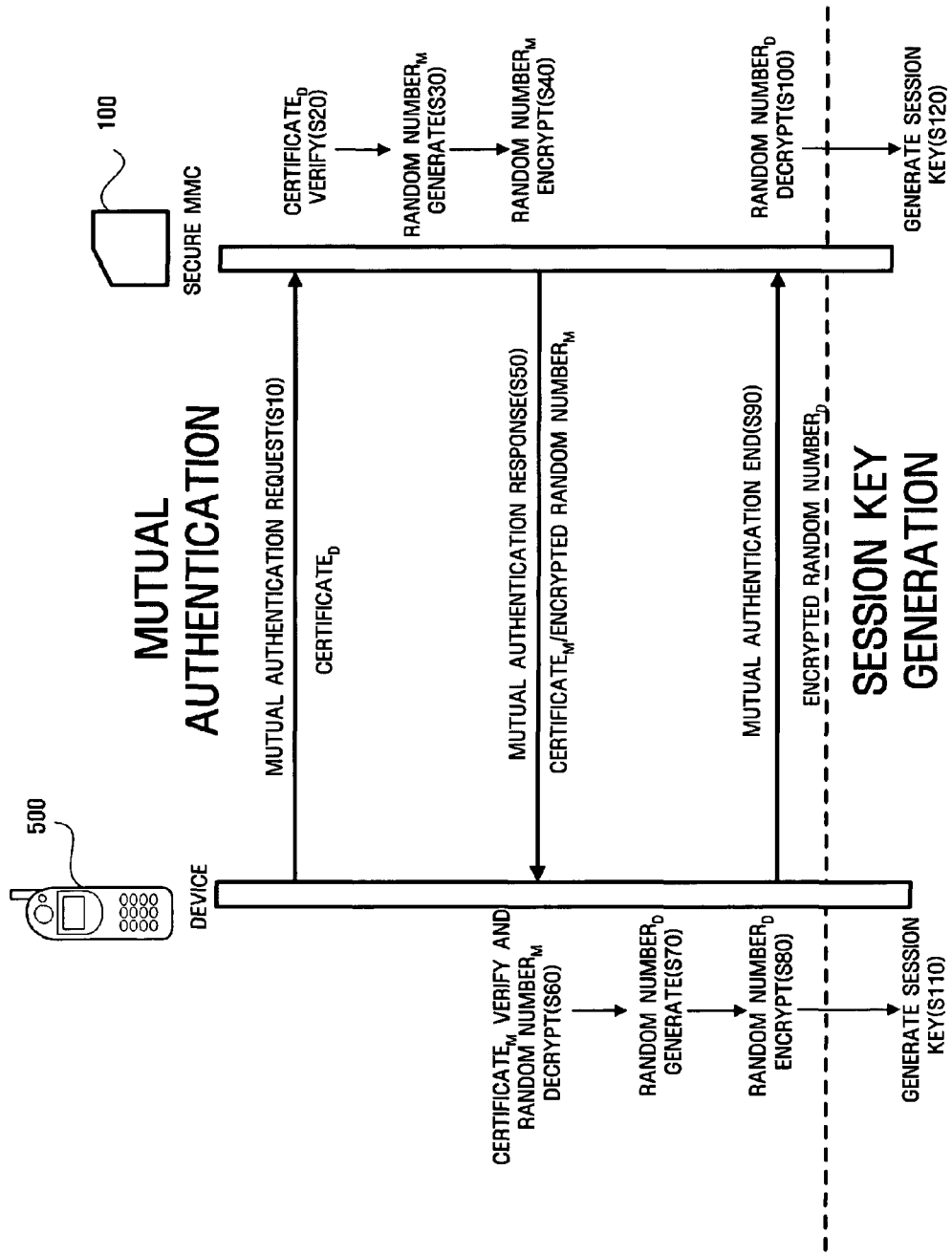
FIG. 3 is a flowchart of a mutual authentication procedure according to an exemplary embodiment of the present invention.

FIG. 3 is a flowchart of a mutual authentication procedure according to an exemplary embodiment of the present invention. Mutual authentication is a procedure in which a device 500 and a secure MMC 100 authenticate each other's genuineness and exchange random numbers for generation of a session key. A session key can be generated using a random number obtained during mutual authentication. In FIG. 3, descriptions above arrowed lines relate to a command requesting another device to perform a certain operation and descriptions below the arrow-headed lines relate to a parameter needed to execute the command or data transported. In an embodiment of the present invention, the device 500 issues all commands for the mutual authentication and the secure MMC 100 performs operations needed to execute the command. For example, a command such as a mutual authentication response may be sent from the device 500 to the secure MMC 100. Then, the secure MMC 100 sends a certificate$_M$ and an encrypted random number$_M$ to the device 500 in response to the mutual authentication response. In another exemplary embodiment of the present invention, both of the device 500 and the secure MMC 100 may issue commands. For example, the secure MMC 100 may send the mutual authentication response together with the certificate$_M$ and the encrypted random number$_M$ to the device 500. Detailed descriptions of the mutual authentication procedure will be set forth below.

In operation S10, the device 500 sends a mutual authentication request command to the secure MMC 100. When requesting mutual authentication, the device 500 sends the device's public key to the secure MMC 100. In operation S10, a certificate$_D$ issued to the device by a certification authority is sent. The certificates is signed with a digital signature of the certification authority and contains the device's ID and public key. Based on the certificates, the secure MMC 100 can authenticate the device 500 and obtain the device's public key.

In operation S20, the secure MMC 100 verifies whether the certificates is valid using a certificate revocation list (CRL). If the certificates$_D$ is registered in the CRL, the secure MMC 100 may reject mutual authentication with the device 500. If the certificate$_D$ is not registered in the CRL, the secure MMC 100 obtains the device's public key using the certificate$_D$.

In operation S30, the secure MMC 100 generates a random number$_M$. In operation S40, the random number$_M$ is encrypted using the device's public key. In operation S50, a mutual authentication response procedure is performed by sending a mutual authentication response command from the device 500 to the secure MMC 100 or from the secure MMC 100 to the device. During the mutual authentication response procedure, the secure MMC 100 sends the secure MMC's public key and encrypted random number$_M$ to the device 500. In an embodiment of the present invention, instead of the secure MMC's public key, a certificate$_M$ of the secure MMC 100 may be sent. In another exemplary embodiment of the present invention, the secure MMC 100 may send its digital signature to the device 500 together with the encrypted random number$_M$ and the certificate$_M$.

In operation S60, the device 500 receives the certificate$_M$ and the encrypted random number$_M$, authenticates the secure MMC 100 by verifying the certificate$_M$, obtains the secure MMC's public key, and obtains the random number$_M$ by decrypting the encrypted random number$_M$ using the device's private key. In operation S70, the device 500 generates a random number$_D$. In operations S80, the random number$_D$ is encrypted using the secure MMC's public key. Thereafter, a mutual authentication end procedure is performed in operation S90 where the device 500 sends the encrypted random number$_D$ to the secure MMC 100. In an embodiment of the present invention, the device 500 may send its digital signature to the secure MMC 100 together with the encrypted random number$_D$.

In operation S100, the secure MMC 100 receives and decrypts the encrypted random number$_D$. As a result, the device 500 and the secure MMC 100 can know each other's random number. Here, since both the device 500 and the secure MMC 100 generate their own random numbers and use each other's random numbers, randomness can greatly increase and secure mutual authentication is possible. In other words, even if one of the device 500 and the secure MMC 100 has weak randomness, the other of them can supplement randomness.

A random number may be generated using a random number generation module (not shown). Alternatively, a random number may be one number selected from a plurality of numbers stored in a device or a secure MMC or a combination of multiple numbers selected therefrom. In addition, a random number may not only be a numeral but a character string. Accordingly, a random number may indicate a number, a combination of numbers, or a character string that is generated using a random number generation module, or may indicate one number, a combination of multiple numbers, one character string, or a combination of multiple character strings selected from a plurality of numbers or character strings stored previously.

In operations S110 and S120, each of the device 500 and the secure MMC 100 generate their session keys using both of their two random numbers. To generate a session key using the two random numbers, an algorithm that has been published may be used. A simple algorithm is XORing of two random numbers. Once the session keys are generated, diverse operations protected by DRM can be performed between the device 500 and the secure MMC 100.

An application protocol data unit (APDU) is a unit of information transmitted between a device and a secure MMC and may include an authentication command, a command for executing a copy or a move of an RO, a command for playback, or a command for checking a card state and parameters for the command. In embodiments of the present invention, setting of a command for executing a particular function is achieved with an instruction and parameters in an APDU when it is transmitted.

Before describing the move and copy of an RO, a send sequence counter (SSC) for executing instructions will be described first. FIG. 4 is a flowchart of a procedure for applying an SSC. In an SSC mechanism, when an APDU is transmitted, a sequence number is allocated to the APDU. Accordingly, it can be verified whether an APDU is lost during transmission or whether an unauthorized APDU is transmitted. The sequence number increases with a transmission of an APDU. In an example shown in FIG. 4, the sequence number increases by 1. To transmit an APDU, a mutual authentication procedure is performed first in operation S121. In operation S122, an APDU is transmitted from a device 500 to a secure MMC 100. An SSC value stored in the APDU is equal to (init_SSC+1), where init_SSC is an initial value of the SSC. In operation S130, another APDU relating to execution of a subsequent instruction is transmitted from the secure MMC 100 to the device 500. At this time, an SSC value stored in the APDU is equal to (init_SSC+2). The SSC value stored in the APDU transmitted in operation S130 is one greater than that stored in the APDU transmitted in the previous operation, i.e., operation S122. Thus, the APDU transmitted in operation S130 is determined valid and is executable. However, when an error occurs, after an APDU having N as the SSC value is transmitted in operation S170, an APDU having (N+2) as the SSC value may be transmitted for execution of a subsequent instruction in operation S180. Normally, the APDU transmitted in operation S180 should have (N+1) as the SSC value. Accordingly, in this case, it can be inferred that one APDU is lost. Consequently, since the APDU transmitted in operation S180 is not proper, the device 500 may not process it. In exemplary embodiments of the present invention, an SSC value may be allocated to the move or copy of an RO to verify whether any RO is lost during the move or copy.

Instructions and parameters needed to move and copy an RO will be described with reference to FIGS. 5A and 5B.

As shown in FIG. 5A, a move is divided into two cases 10 and 20. In case 10, an RO is moved from a device to a secure MMC and necessary instructions are SET_MOVE_RO and GET_CONFIRM. The functions of these instructions will later be described with reference to FIG. 6.

In case 20, an RO is moved from a secure MMC to a device and necessary instructions are SET_SELECT_RO, GET_MOVE_RO, and SET_CONFIRM. The functions of these instructions will later be described with reference to FIG. 7.

Copy is also divided into two cases 30 and 40. In case 30, an RO is copied from a device to a secure MMC and necessary instructions are SET_COPY_RO and GET_CONFIRM. The functions of these instructions will later be described with reference to FIG. 8.

In case 40, an RO is copied from a secure MMC to a device and necessary instructions are SET_SELECT_RO, GET_COPY_RO, and SET_CONFIRM. The functions of these instructions will later be described with reference to FIG. 9.

Parameters for the instructions used in the cases 10 through 40 will now be described with reference to FIG. 5B. An ROType 51 determines a type of an RO that is moved or copied. "0x00" indicates a general RO, "0x01" indicates a parent RO, and "0x02" indicates a child RO. The parent RO and the child RO will later be described with reference to FIG. 16.

An SMRF 52 denotes a format supported by a secure MMC. Since a format stored in a host or a device may be different from a format supported by a secure MMC, the format of an RO must be converted to be suitable for the secure MMC when the RO is moved or copied to the secure MMC.

An RID 53 denotes an identifier (ID) of an RO. An ACK 54 is a resultant value of a move or a copy. A resultant value of "0" denotes a success and a result value of "1" denotes a failure. An ORO 55 denotes an original RO and includes information regarding the future usability thereof.

These parameters are just examples. Configuration, values, and types of parameters may be different in other embodiments of the present invention.

FIG. 6 is a flowchart of a procedure for moving an RO from a device 500 to a secure MMC 100. To move an RO, a mutual authentication must be performed in operation S210 first, as described above. Here, it is assumed that the device 500 knows an ID of an RO to be moved, i.e., an RID. A $K_{SEK}$ is generated as a session key through the mutual authentication, and instructions are encrypted using the session key and then transmitted. In descriptions appearing later in this specification, it is assumed that data transmitted between the device 500 and the secure MMC 100 is encrypted using this session key. SC.Encrypt ($K_{SEK}$ parameter1||parameter2|| . . . parametern) denotes that parameters from 1 to n of an instruction are encrypted using the session key $K_{SEK}$ when the instruction is transmitted. In operation S230, the device 500 configures an APDU with an instruction SET_MOVE_RO and transmits the APDU to the secure MMC 100. Here, AppendInfo, SSC, ROType, and SMRF values are transmitted, and an ORO is selectively transmitted.

AppendInfo is information regarding how an APDU data block is appended. Length information and information on the number of blocks are contained in AppendInfo. As described above, the SSC contains a sequence number. The ROType, SMRF, and ORO have been described above with reference to FIG. 5B. When the move of the RO is completed, the device 500 receives information regarding the result of the move from the secure MMC 100 in operation S240. This operation is performed in response to an instruction GET_CONFIRM comprised of an SSC value and an ACK value. When the instruction GET_CONFIRM is executed, the moved RO becomes invalid in the device 500. In other words, when the RO is moved to the secure MMC 100, the device 100 deletes the moved RO therefrom or makes the moved RO unusable therein.

FIG. 7 is a flowchart of a procedure for moving an RO from a secure MMC 100 to a device 500. In operation S310, a mutual authentication is performed and a session key $K_{SEK}$ is generated. In operation S330, the device 500 sends an instruction SET_SELECT_RO to the secure MMC 100. Here, an SSC value and an RID of an RO to be moved are transmitted as parameters. In response to the instruction, the secure MMC 100 transmits the RO together with an instruction GET_MOVE_RO in operation S340. Here, the RO is converted into a format corresponding to an SMRF. The instruction GET_MOVE_RO contains parameters AppendInfo, SSC, ROType, and SMRF. An ORO may be added selectively. When the move of the RO is completed, in operation S350, the device 500 transmits an instruction SET_CONFIRM containing an ACK parameter to the secure MMC 100 to report a success or a failure of the move. When the move is successful, the secure MMC 100 deletes the moved RO therefrom or makes the move RO unusable therein.

Figure 8:
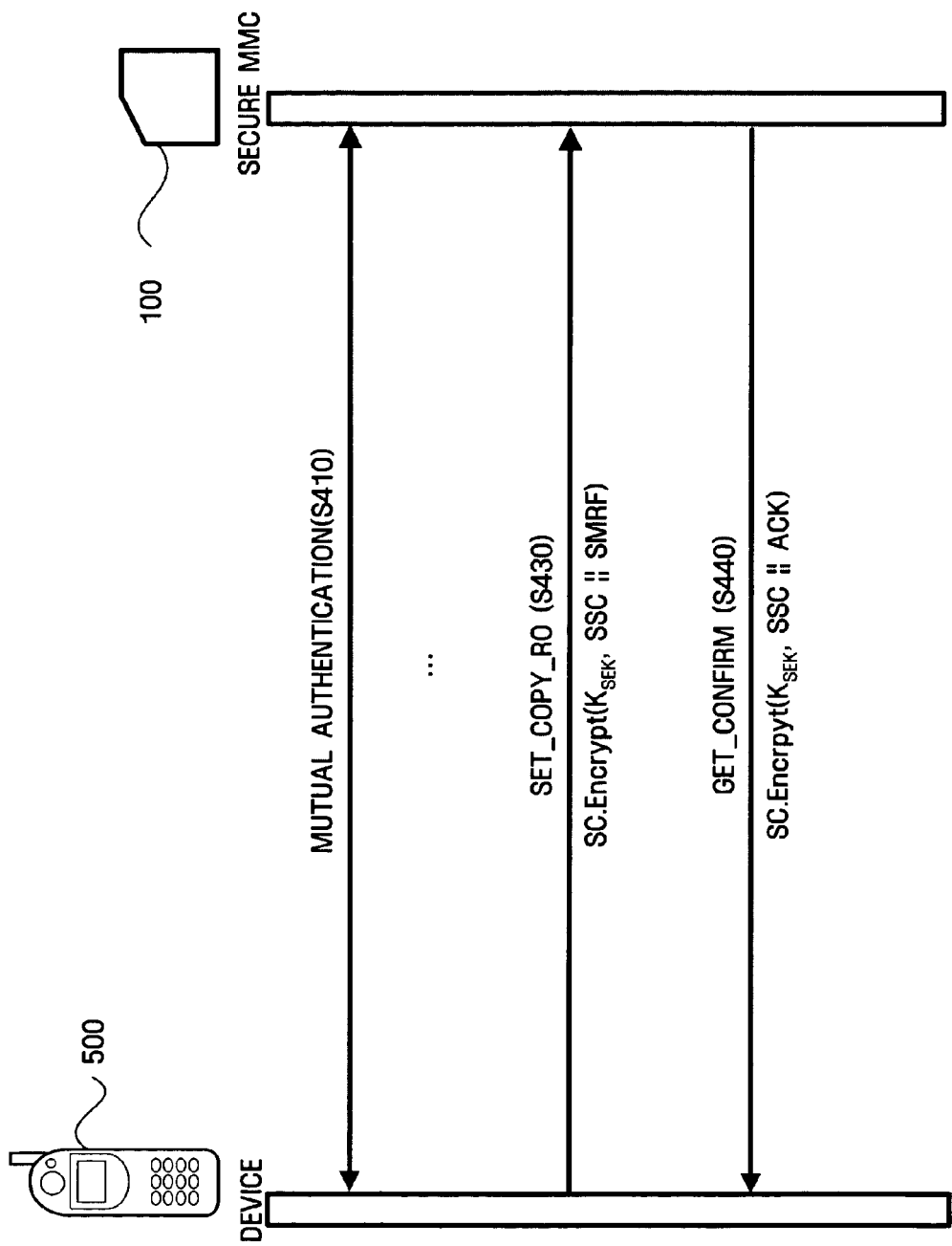
FIG. 8 is a flowchart of a procedure for copying an RO from a device to a secure MMC according to an exemplary embodiment of the present invention.

FIG. 8 is a flowchart of a procedure for copying an RO from a device 500 to a secure MMC 100. In operation S410, mutual authentication is performed. Here, it is assumed that the device 500 knows an RID of an RO to be copied. A session key $K_{SEK}$ is generated through the mutual authentication, and instructions are encrypted using the session key $K_{SEK}$ before being transmitted. In operation S430, the device 500 configures an APDU with an instruction SET_COPY_RO and transmits the APDU to the secure MMC 100. At this time, an SSC and an SMRF are transmitted. The SMRF is obtained by converting the RO into a format supported by the secure MMC 100. The secure MMC 100 decrypts the RO received from the device 100 using the session key $K_{SEK}$ and stores the decrypted RO. When the copy of the RO is completed, the device 500 obtains information regarding the result of the copy from the secure MMC 100 in operation S440. This operation is possible through an instruction GET_CONFIRM comprised of an SSC and an ACK. When the instruction GET_CONFIRM is executed, the device 500 changes information regarding the copied RO, for example, by decreasing the number of available copies.

Figure 9:
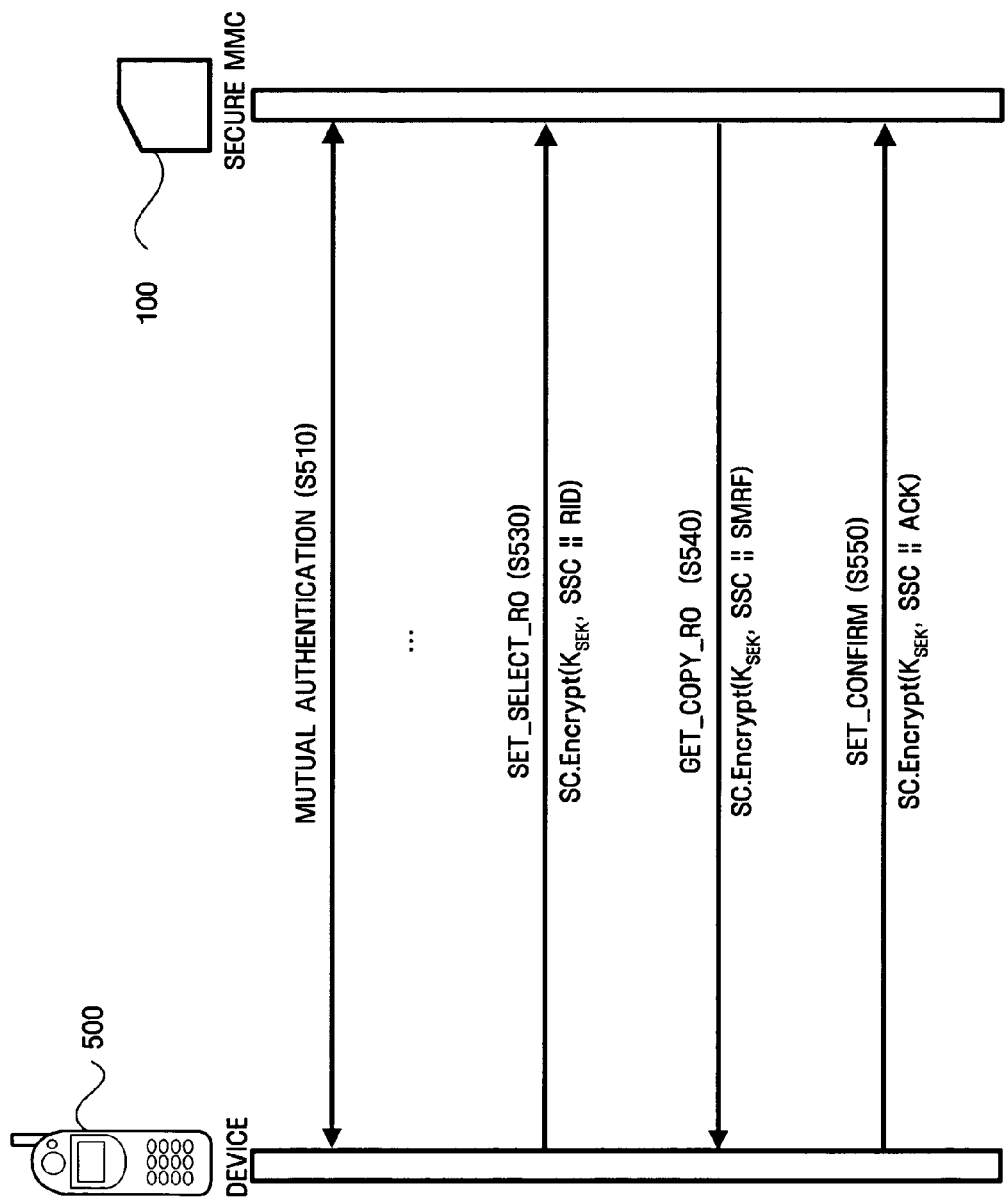
FIG. 9 is a flowchart of a procedure for copying an RO from a secure MMC to a device according to an exemplary embodiment of the present invention.

FIG. 9 is a flowchart of a procedure for copying an RO from a secure MMC 100 to a device 500. In operation S510, mutual authentication is performed and a session key $K_{SEK}$ is generated. In operation S530, the device 500 sends an instruction SET_SELECT_RO having an SSC and an RID of an RO to be copied as parameters to the secure MMC 100. In response to the instruction, in operation S540, the secure MMC 100 sends an instruction GET_COPY_RO with the RO to be copied to the device 500. Here, the RO to be copied is converted into a format corresponding to an SMRF. The parameters of the instruction GET_COPY_RO are an SSC and an SMRF. When the copy of the RO is completed, in operation S550, the device 500 sends an instruction SET_CONFIRM with an ACK parameter to the secure MMC 100 to report the success or failure of the copy. When the copy is successful, the secure MMC 100 changes information regarding the copied RO, for example, by decreasing the number of available copies. Since an RO is newly generated in the case of a copy, a limitation may be made such that only an original RO can be copied.

Figure 10:
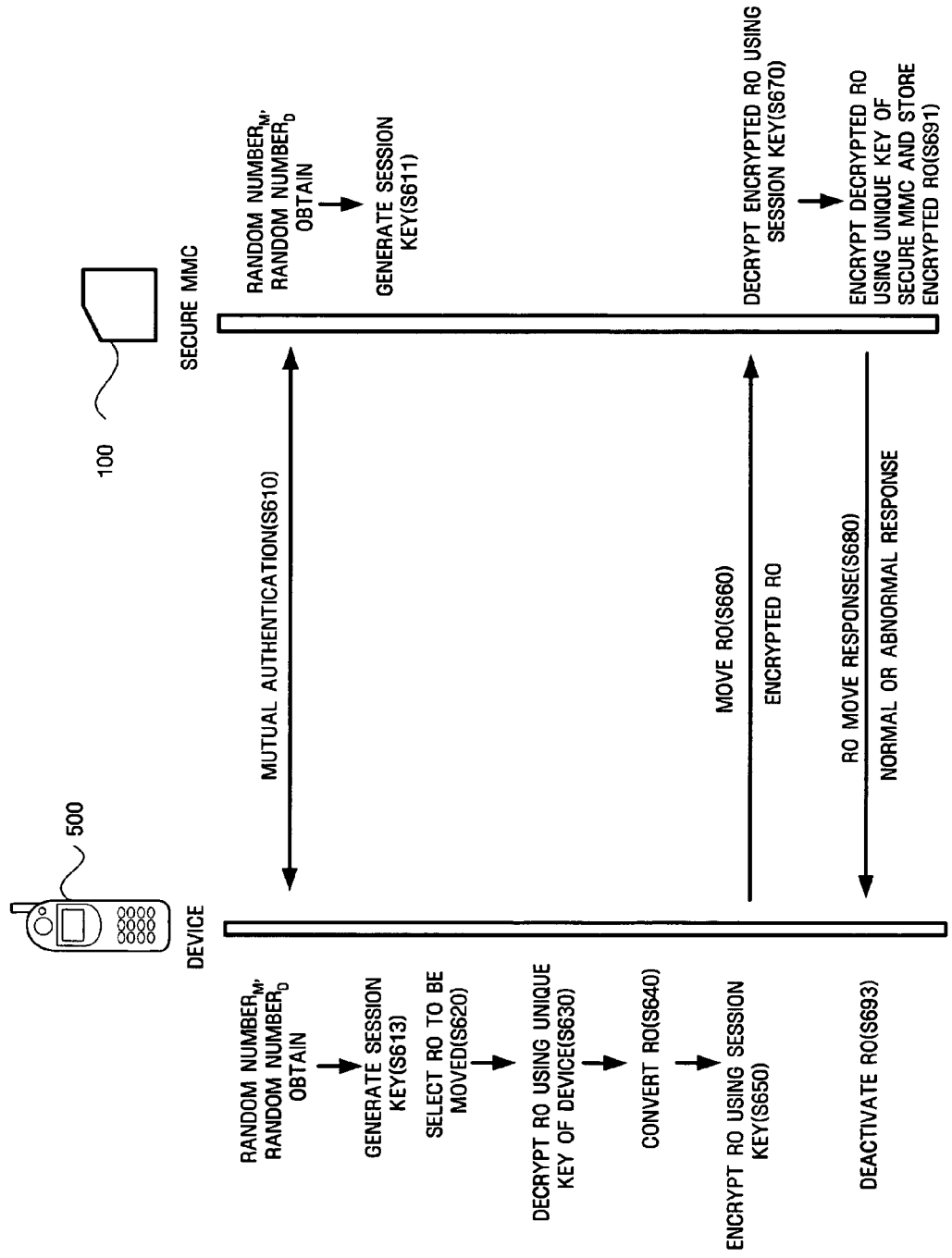
FIG. 10 is a flowchart of a protocol for moving an RO from a device to a secure MMC according to an exemplary embodiment of the present invention.

Other exemplary embodiments of moving an RO shown in FIGS. 6 and 7 will be described below. FIG. 10 is a flowchart of a protocol for moving an RO from a device 500 to a secure MMC 100 according to an exemplary embodiment of the present invention.

The move from the device 500 to the secure MMC 100 can be performed on an RO and protected content that are kept by the device 500. Hereinafter, a case of moving an RO kept by the device 500 will be described.

Before the device 500 moves an RO to the secure MMC 100, in operation S610, mutual authentication is performed between the device 500 and the secure MMC 100. In operations S611 and S613, the secure MMC 100 and the device 500 each generate the session keys for encryption and decryption.

To select an RO to be moved to the secure MMC 100 in operation S620, a user of the device 500 searches information regarding ROs stored in the device 500. Based on the information regarding the ROs, the user determines whether the RO to be moved is present in the device 500 and whether the RO to be moved has a move permission among export permissions. If the RO to be moved is present and has the move permission, in operation S630, the RO that has been encrypted and stored in the device 500 is decrypted using a unique key of the device 500. In operation S640, constraint information regarding the move permission of the RO is changed and the RO is converted into an appropriate format.

In operation S650, the converted RO is encrypted using the session key common to the device 500 and the secure MMC 100. In operation S640, the appropriate format is a format supported by the secure MMC 100.

When the device 500 downloads an RO, rights expression language (REL) is usually extensible markup language (XML) or wireless application protocol binary XML (WBXML). For example, a right to play expressed in XML is as follows.

```
<o-ex:rights
  xmlns:o-ex="http://odrl.net/1.1/ODRL-EX"
  xmlns:o-dd="http://odrl.net/1.1/ODRL-DD"
>
<o-ex:context>
<o-dd:version>1.0</o-dd:version>
</o-ex:context>
<o-ex:agreement>
<o-ex:asset>
<o-ex:context>
<o-dd:uid>cid:4567829547@foo.com</o-dd:uid>
</o-ex:context>
</o-ex:asset>
<o-ex:permission>
<o-dd:play/>
</o-ex:permission>
</o-ex:agreement>
</o-ex:rights>
```

When the RO stored in the device 500 in an XML format is moved to a portable storage device, i.e., the secure MMC 100, without format conversion, the RO may be overhead to the secure MMC 100 having less storage capacity than the device

500. For this reason, in embodiments of the present invention, the right to play and the constraint information are converted into a binary format smaller than XML text when they are transmitted to the secure MMC 100. An RO format supported by the secure MMC 100 will later be described with reference to FIG. 16.

In other exemplary embodiments of the present invention, the RO may be divided into two portions for the format conversion in operation S640.

For example, if an RO allows a particular movie content to be viewed five times, the RO may be divided into a right to view three times and a right to view two times at a user's request. In this situation, a moving process can be performed to assign only the right to view two times to a user of another device.

The device 500 encrypts the RO, converted into the appropriate format, using the session key in operation S650 and sends the encrypted RO to the secure MMC 100 in operation S660. To encrypt the RO, a symmetric cryptographic algorithm such as a data encryption standard (DES) or an advanced encryption standard (AES) may be used.

In operation S670, the secure MMC 100 decrypts the encrypted RO received from the device 500 using the session key. In operation S691, the secure MMC 100 encrypts the decrypted RO using its unique key according to an encryption algorithm defined therein and stores the encrypted RO. Thereafter, in operation S680, the secure MMC 100 sends an output response to the device 500 to report whether the moving process is normally completed.

Information reporting whether the moving process is normally completed may be expressed by a status word within the output response to a move instruction from the device 500 or may be sent as separate acknowledgement. The secure MMC 100 may assign the status word a value indicating a success when the moving process is normally completed and a value indicating a failure and the number of attempts when the moving process is not normally completed to report the result of the moving process to the device 500. The status word within the output response to the move instruction will be described with reference to FIG. 23 later. A normal response may be a status word indicating that an instruction has been executed successfully or response information separately generated by the secure MMC 100 to indicate that move has been successfully performed.

If a response reporting that the moving process has been normally completed, i.e., the normal response, is received from the secure MMC 100, in operation S693, the device 500 deactivates the original of the moved RO to prevent the RO from existing in both of the device 500 and the secure MMC 100. To deactivate the original of the RO, it may be deleted or a tag for indicating activation or deactivation of the RO may be set to a deactivated state.

If the device 500 does not receive the normal response reporting that the moving process has been normally completed within a predetermined period of time or receives an abnormal response reporting that the moving process has not been normally completed, the device 500 deactivates the RO and reports the failure of the moving process to the user of the device 500. At this time, the secure MMC 100 also deactivates the received RO. Deactivating of an RO undergoing a move or copy process may be implemented by setting a tag, which indicates the state of the RO as one of an activated state, a deactivated state, and a tentative state, to the tentative state. The deactivating of the RO is performed to prevent a duplicate of the RO from being generated due to an abnormal moving process and prevent malicious users from stealing the RO.

When the device 500 does not receive a normal response within the predetermined period of time or receives a abnormal response, and thus, the RO in the tentative or deactivated state is present in both of the device 500 and the secure MMC 100, the device 500 checks log data or the like when thereafter accessing the secure MMC 100 to determine which of the respective ROs in the device 500 and the secure MMC 100 will be activated and changes a tag of the RO determined to be activated into the activated state.

In another embodiment of the present invention, when the move of an RO fails, it may be retried according to the available number of attempts.

Figure 11:
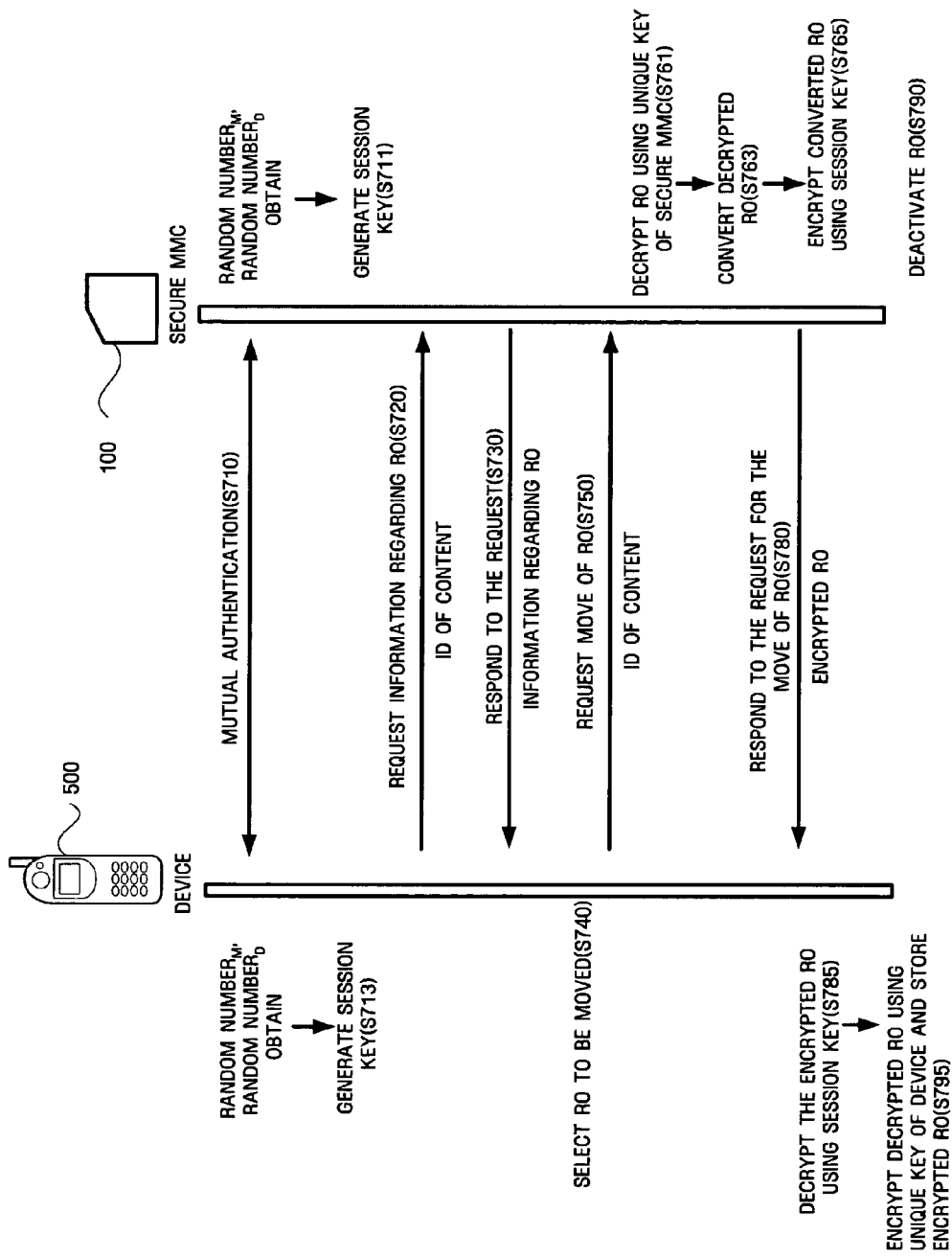
FIG. 11 is a flowchart of a protocol for moving an RO from a secure MMC to a device according to an exemplary embodiment of the present invention.

FIG. 11 is a flowchart of a protocol for moving an RO from a secure MMC 100 to a device 500 according to an exemplary embodiment of the present invention.

The move from the secure MMC 100 to the device 500 can be performed on an RO and protected content that are kept by the secure MMC 100. Hereinafter, a case of moving an RO kept by the secure MMC 100 will be described.

Before the device 500 requests information regarding ROs from the secure MMC 100, in operation S710, mutual authentication is performed between the device 500 and the secure MMC 100. In operations S711 and 713, the secure MMC 100 and the device 500 respectively generate the session keys for encryption and decryption.

To select an RO to be moved from the secure MMC 100 to the device 500, in operation S720, a user of the device 500 requests information regarding ROs stored in the secure MMC 100. Information regarding particular ROs may be request by sending information regarding content, e.g., an ID of the content, or an ID of an RO to the secure MMC 100. Alternatively, a list of all available ROs kept by the secure MMC 100 may be requested. In operation S730, the information regarding the ROs is received from the secure MMC 100 in response to the request. In operation S740, the user selects an RO to be moved based on the received information.

When selecting the RO to be moved, the user determines whether the RO to be moved to the device 500 is present in the secure MMC 100 and whether the RO to be moved has a move permission among export permissions. If the RO to be moved is present and has the move permission, in operation S750, moving of the selected RO is requested. In operation S761, the secure MMC 100 decrypts the corresponding RO, which has been encrypted and stored therein, using its unique key. In operation S763, constraint information regarding the move permission of the RO is changed and the RO is converted into an appropriate format. In operation S765, the converted RO is encrypted using the session key common to the device 500 and the secure MMC 100.

In operation S763, the appropriate format may be a DRM system format supported by the device 500. For example, a format of the RO stored in the secure MMC 100 is converted into an XML format or a WBXML format supported by the device 500.

In other exemplary embodiments of the present invention, the RO may be divided into two portions for the format conversion in operation S763.

The secure MMC 100 encrypts the RO, converted into the appropriate format, using the session key in operation S765 and sends the encrypted RO to the device 500 in operation S780. To encrypt the RO, a symmetric cryptographic algorithm such as a DES or an AES may be used.

In operation S785, the device 500 decrypts the encrypted RO received from the secure MMC 100 using the session key. In operation S795, the device 500 encrypts the decrypted RO using its unique key according to an encryption algorithm defined therein and stores the encrypted RO.

When the move of the RO from the secure MMC 100 is normally completed, the device 500 makes the secure MMC 100 deactivate the RO in the secure MMC 100 to prevent the RO from existing in both of the device 500 and the secure MMC 100. To deactivate the RO, the RO may be deleted or a tag for indicating activation or deactivation of the RO may be set to a deactivated state.

If the moving process is not normally completed, the device 500 deactivates the received RO and reports the failure of the moving process to the user of the device 500. At this time, the secure MMC 100 also deactivates the RO therein. Deactivating of an RO undergoing a move or copy may be implemented by setting a tag, which indicates a state of the RO as one of an activated state, a deactivated state, and a tentative state, to the tentative state. The deactivating of the RO is performed to prevent a duplicate of the RO from being generated due to an abnormal moving process and prevent malicious users from stealing the RO.

When the moving process is not normally completed and thus the RO in the tentative or deactivated state is present in both of the device 500 and the secure MMC 100, the device 500 checks log data or the like when thereafter accessing the secure MMC 100 to determine which of the respective ROs in the device 500 and the secure MMC 100 will be activated and changes a tag of the RO determined to be activated into the activated state.

Other embodiments of copying an RO shown in FIGS. 8 and 9 will be described with reference to FIGS. 12 through 15.

Figure 12:
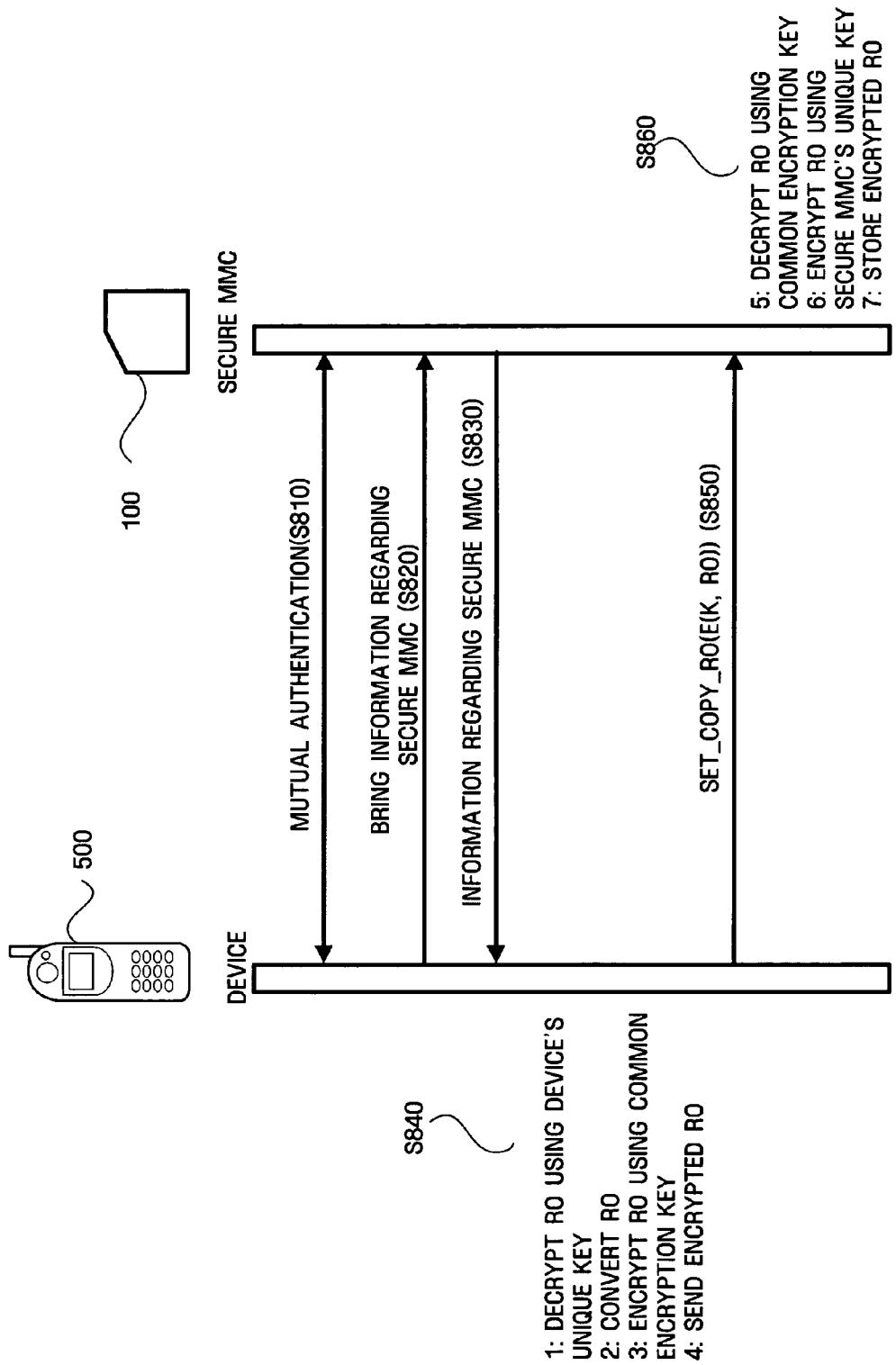
FIG. 12 is a flowchart of a procedure for copying an RO of a digital work in a device to a secure MMC according to an exemplary embodiment of the present invention.

FIG. 12 is a flowchart of a procedure for copying an RO of a digital work in a device 500 to a secure MMC 100. As described above, to perform a predetermined operation (e.g., a play, a copy, or a move) between the device 500 and a portable storage device such as the secure MMC 100, mutual authentication must be performed in operation S810. Through the mutual authentication, a common encryption key K, i.e., a session key, needed to encrypt data and transmit the data between two devices is generated. Before copying an RO, the secure MMC 100 may be checked to find whether the secure MMC 100 has enough space to store the RO in operations S820 and S830. Thereafter, in operation S840, the device 500 performs tasks needed to send the RO to the secure MMC 100. Since ROs are usually encrypted and then stored in a device to prevent the ROs from being easily manipulated, the ROs need to be decrypted before being copied. Accordingly, first action in operation S840, the device 500 decrypts an encrypted RO using its unique key and converts the decrypted RO into an appropriate format that can be stored in the secure MMC 100. The format conversion is performed since an RO format in the device 500 may be different from that in the secure MMC 100. For example, while an RO is stored in the device 500 in an XML or WBXML format, a file format that can be recognized by the secure MMC 100 may be a binary file stream considering compression. Therefore, it is necessary to convert the RO to be copied to the secure MMC 100. Thereafter, in operation S840, the device 500 encrypts the converted RO using the common encryption key K for secure transmission. In operation S850, the device 500 sends the encrypted RO to the secure MMC 100 using an instruction SET_COPY_RO. In operation S860, the secure MMC 100 decrypts the encrypted RO received from the device 500 using the common encryption key K, encrypts the decrypted RO using its unique key, and stores the encrypted RO. The secure MMC 100 encrypts the RO before storing it in order to ensure the security of the RO therewithin.

Figure 13:
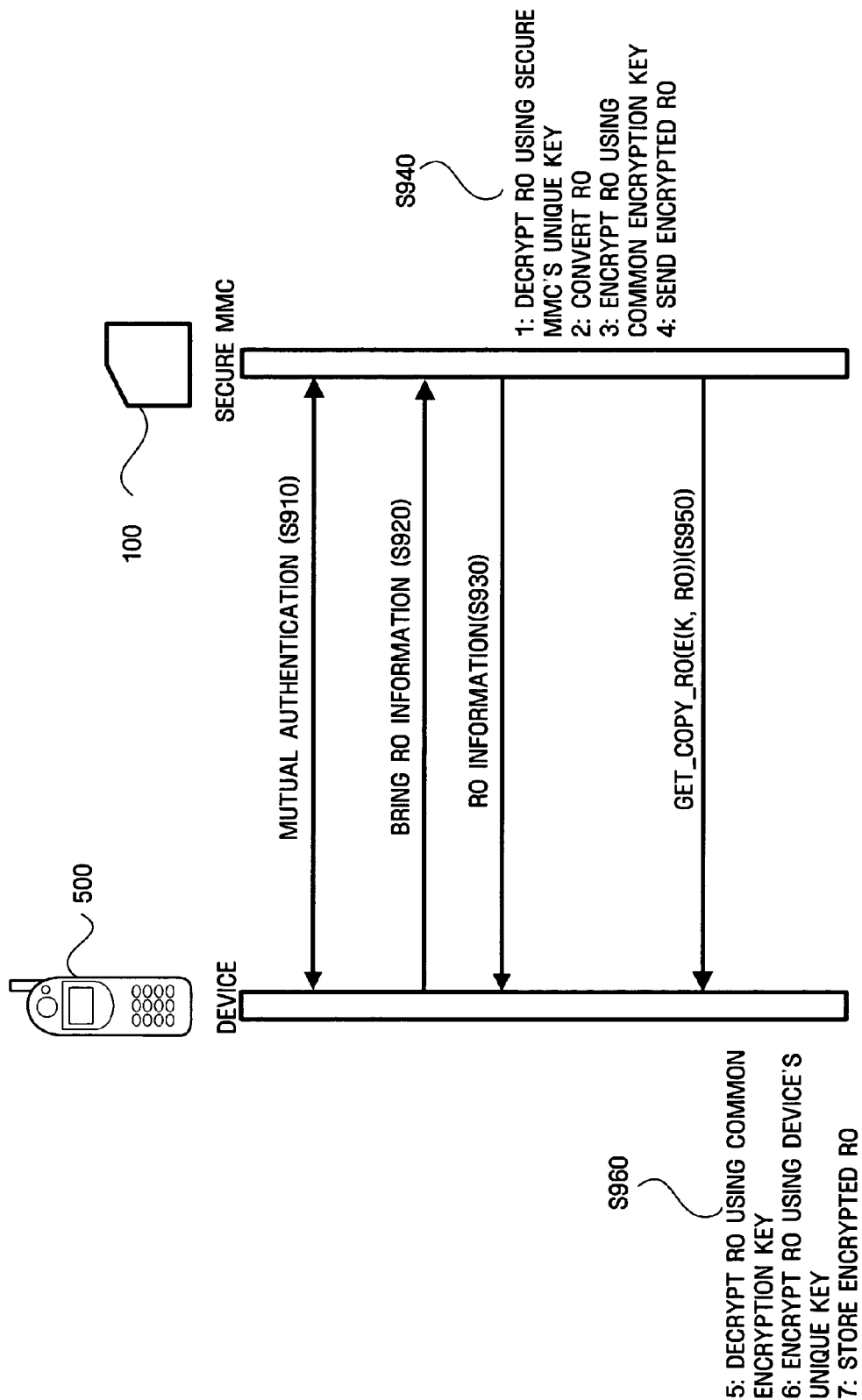
FIG. 13 is a flowchart of a procedure for copying an RO of a digital work stored in a secure MMC to a device according to an exemplary embodiment of the present invention.

FIG. 13 is a flowchart of a procedure for copying an RO of a digital work in a secure MMC 100 to a device 500. In operation S910, mutual authentication is performed, and therefore, a common encryption key K, i.e., a session key, is generated. Before copying an RO, the device 500 may bring RO information from the secure MMC 100 to identify ROs stored in the secure MMC 100 in operations S920 and S930. Thereafter, in operation S940, the secure MMC 100 performs tasks needed to send the RO to the device 500. Since ROs are usually encrypted and then stored in a portable storage device for security of the ROs, in operation S940, the secure MMC 100 decrypts an encrypted RO using its unique key, converts the decrypted RO into a data format that can be stored in the device 500, and encrypts the converted RO using the common encryption key K. In operation S950, the secure MMC 100 sends the encrypted RO to the device 500 using an instruction GET_COPY_RO. The converting of the decrypted RO involves converting the decrypted RO into a file format supported by the device 500. In operation S960, the device 500 decrypts the encrypted RO received from the secure MMC 100 using the common encryption key K, encrypts the decrypted RO using its unique key, and stores the encrypted RO.

Figure 14:
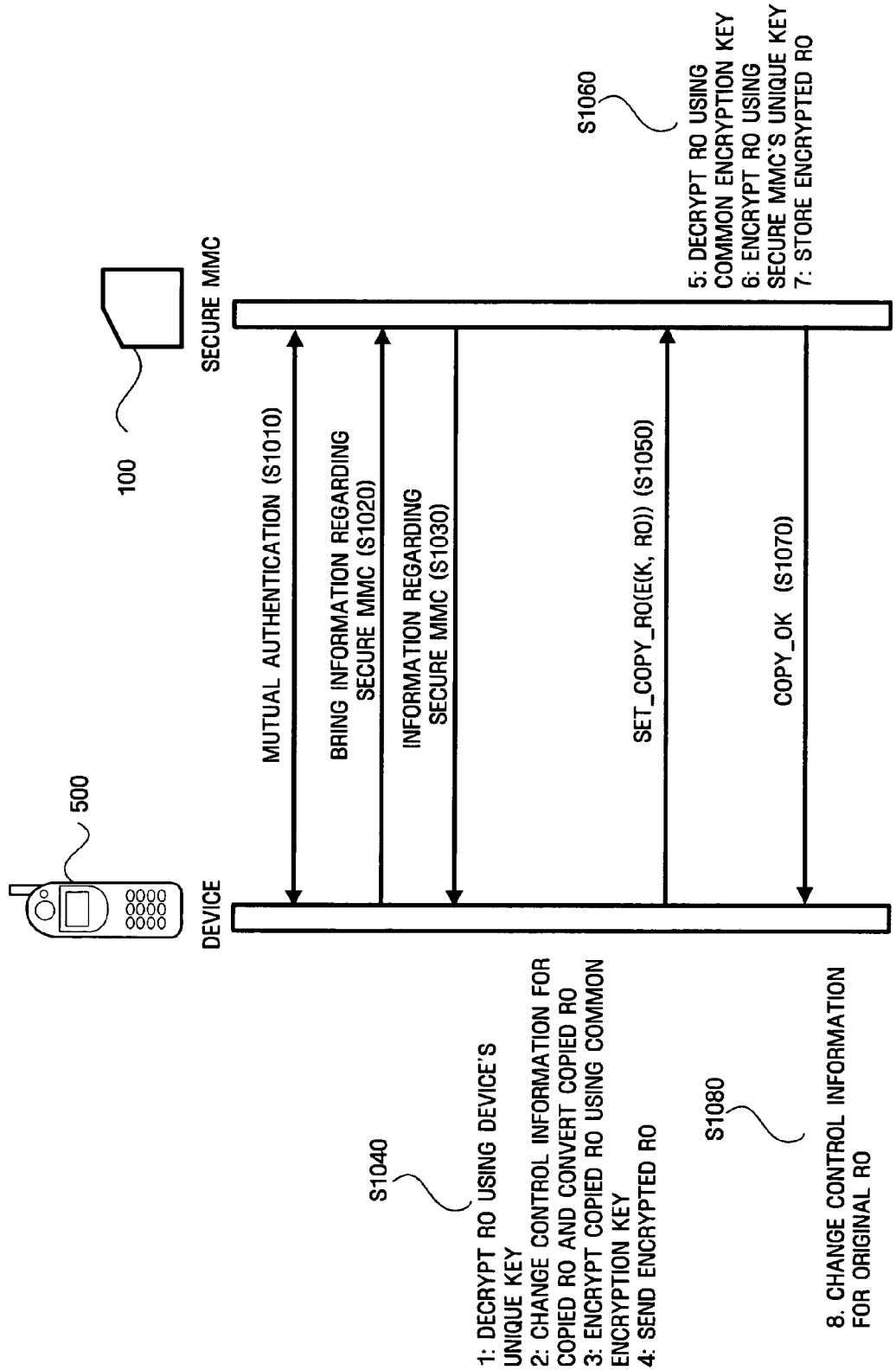
FIG. 14 is a flowchart of a procedure for copying an RO stored in a device to a secure MMC according to an exemplary embodiment of the present invention.
Figure 15:
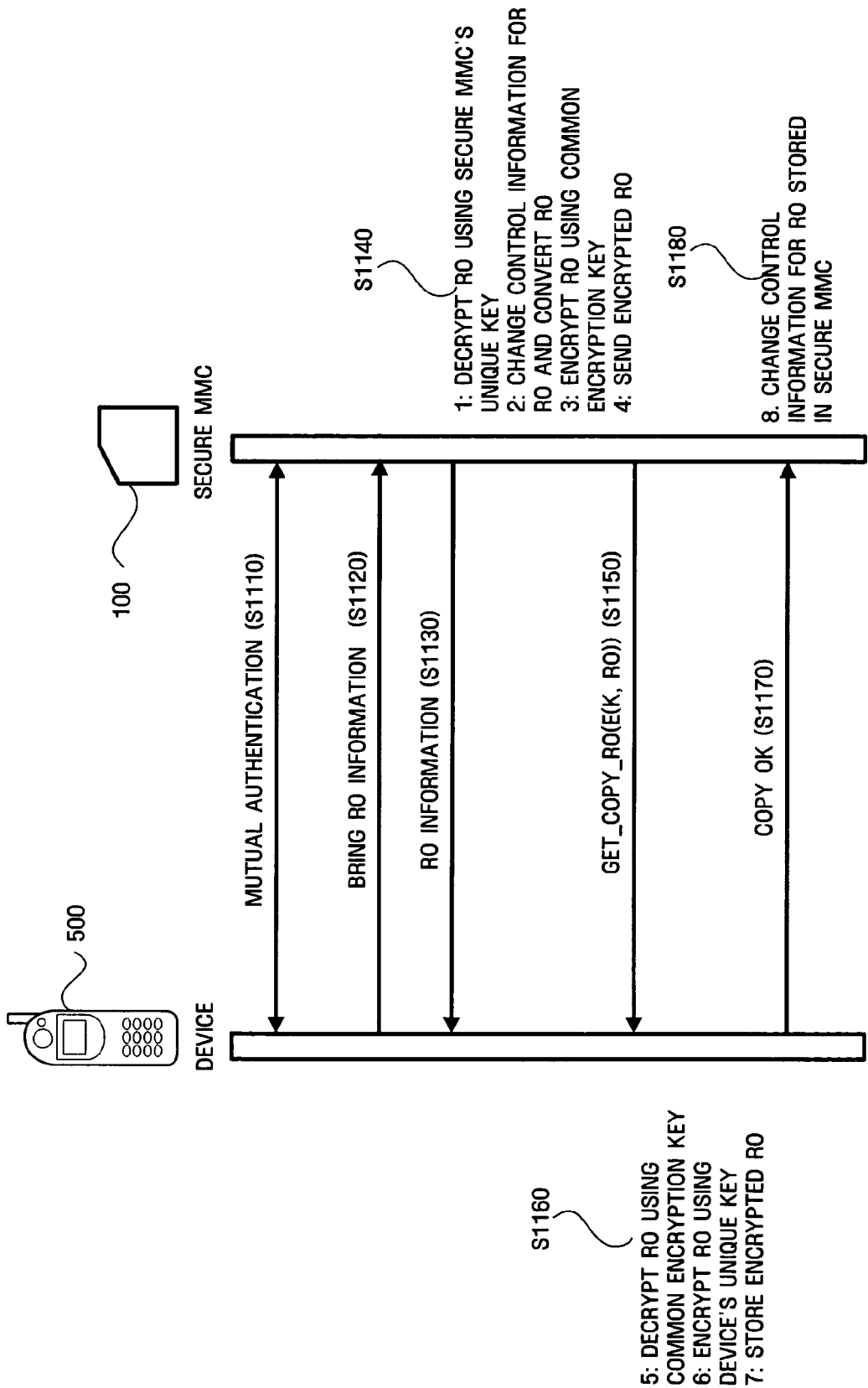
FIG. 15 is a flowchart of a procedure for copying an RO stored in a secure MMC to a device according to an exemplary embodiment of the present invention.

Meanwhile, since copying of an RO involves copying a digital copyright, constraint information for the copying is needed. Constraint information that will be described with reference to FIG. 17 later includes control information for controlling a right to copy. If unlimited copying is permitted, it is difficult to protect copyright. Therefore, the control information is additionally needed. FIGS. 14 and 15 illustrate RO copy procedures enabling copy control. In these procedures, an original RO and its copy must be changed.

FIG. 14 is a flowchart of a procedure for copying an RO stored in a device 500 to a secure MMC 100. Operations S1010, S1020, and S1030 of performing mutual authentication and bringing information regarding the secure MMC 100 are the same as operation S810, S820, and S830 shown in FIG. 12. Operation S1040 is also the same as operation S840, with the exception that a task of changing control information for the copying of the RO is added. In detail, in operation S1040, the device 500 changes the control information, converts the RO, and encrypts the RO using a common encryption key. Here, the control information is changed to agree with a right issued to a copied RO and sent with the copied RO. In operation S1050, the encrypted RO is sent to the secure MMC 100 using an instruction SET_COPY_RO. Operation S1060 performed by the secure MMC 100 receiving the copied RO is the same as operation S860 shown in FIG. 12. In operation S1070, the secure MMC 100 sends a message indicating success to the device 500 when the copying of the RO is normally completed. In response to the message, in operation S1080, the device 500 changes the control information for the original RO stored therein.

FIG. 15 is a flowchart of a procedure for copying an RO stored in a secure MMC 100 to a device 500. Operations S1110, S1120, and S1130 of performing mutual authentication and bringing RO information are the same as operations S910, S920, and S930 shown in FIG. 13. Operation S1140 is also the same as operation S940, with the exception that a task of changing control information for the copying of the RO is added. In detail, in operation S1140, the secure MMC 100 changes the control information, converts the RO into a format suitable for the device 500, and encrypts the RO using a common encryption key. In operation S1150, the encrypted RO is sent to the device 500 using an instruction GET_COPY_RO. Operation S1160 performed by the device 500 receiving the encrypted RO is the same as operation S960 shown in FIG. 13. In operation S1170, the device 500 sends a message indicating success to the secure MMC 100 when the copying of the RO is normally completed. In response to the message, in operation S1180, the secure MMC 100 changes the control information for the RO stored therein.

Figure 16A:
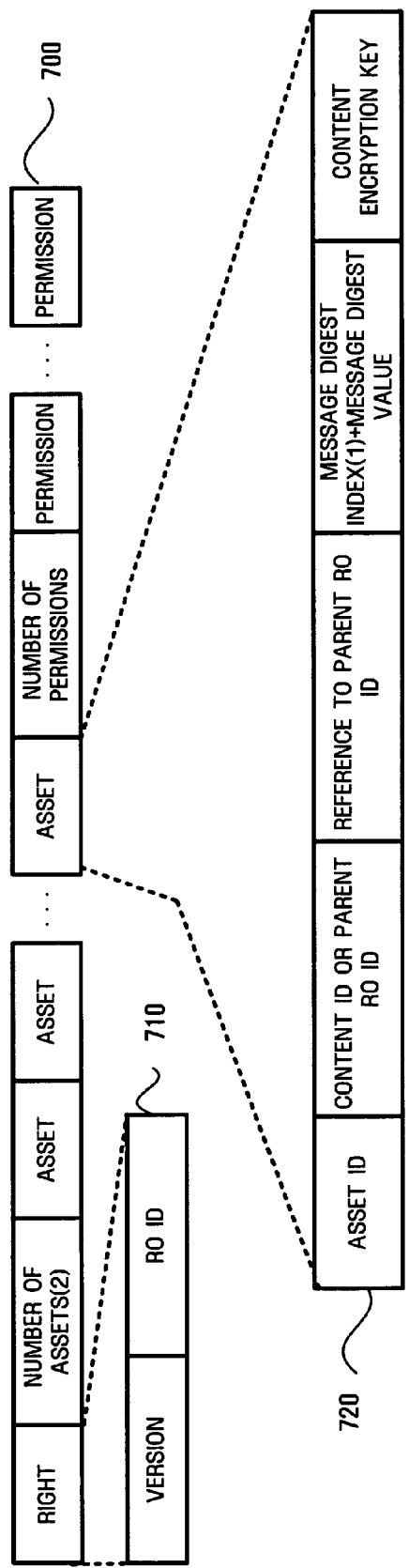
FIGS. 16A and 16B illustrate a structure of a secure MMC RO format (SMRF) according to an exemplary embodiment of the present invention.
Figure 16B:
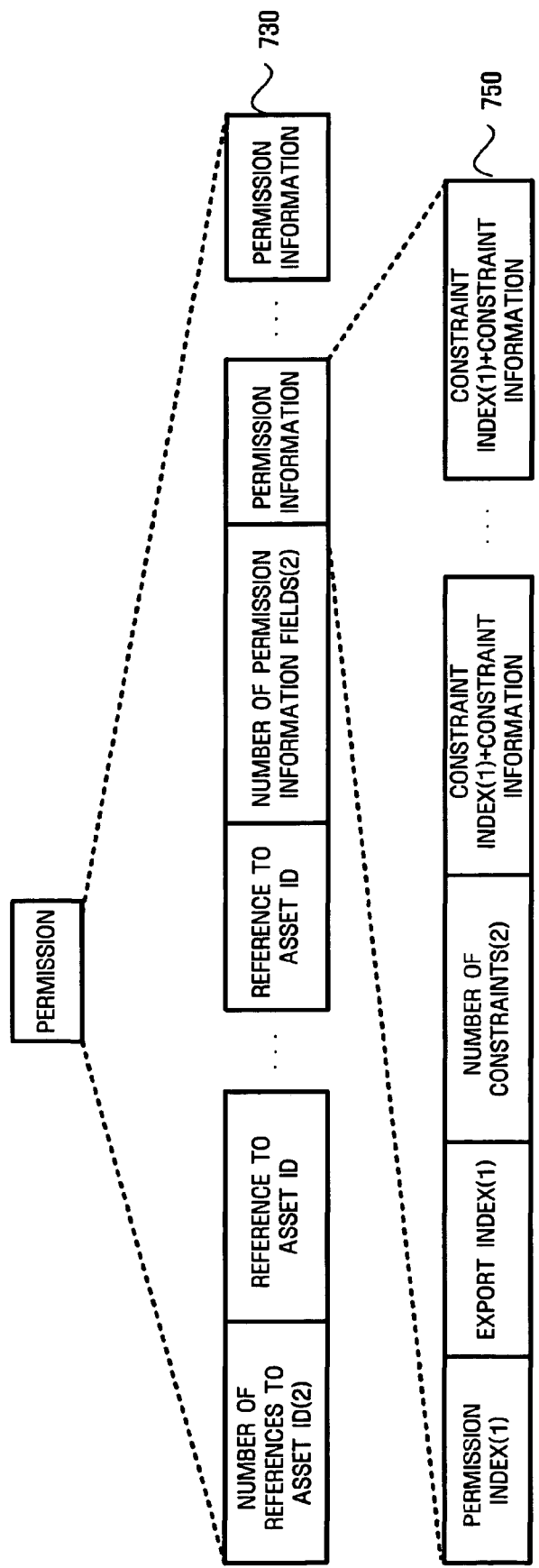

FIGS. 16A and 16B illustrate a structure of a secure MMC RO format (SMRF) 700 according to an exemplary embodiment of the present invention.

As shown in FIG. 5A, SMRF 700 includes a Right field, an Asset field, and a Permission field and may include a plurality of Asset fields and Permission fields. Accordingly, a Number of Assets field indicates the number of Asset fields and a Number of Permissions field indicates the number of Permission fields.

The Right field has a structure 710 including information regarding an RO's version and ID. An Asset field contains information regarding content data, the consumption of which is managed by the RO. A Permission field contains information regarding an actual usage or action permitted by a rights issuer with respect to protected content data.

The Asset field has a structure 720 including an asset ID for identifying a unique asset, a content ID (or a parent RO ID), a reference to the parent RO ID, a message digest index+ message digest value, and a content encryption key (CEK). Since the SMRF 700 may include a plurality of assets, a Number of Assets field is positioned in front of a first Asset field.

When the RO of the SMRF 700 is a parent RO, the parent RO ID instead of the content ID is included. When the RO is a child RO, the reference to the parent RO ID is included.

Here, the parent RO and the child RO are in a relationship in which one RO is defined by inheriting a permission and a constraint from another RO. The parent RO defines a permission and a constraint for DRM content and the child RO inherits them. The child RO refers to the content. However, the parent RO does not directly refer to the content itself but refers to its child. When access to the content is permitted according to permission information regarding the child or parent RO, a DRM agent considers a constraint on the permission granting the access and all upper level constraints on the parent and child ROs. As a result, a rights issuer can support a subscription business model.

The message digest index and the message digest value are provided to protect the integrity of reference to the content. The message digest value is a value generated by a public hash algorithm, e.g., a security hash algorithm1 (SHA1). The message digest index indicates a type of hash algorithm used to generate the message digest value.

The CEK is a binary key value used to encrypt the content. The CEK is also a key value used by a device to decrypt the encrypted content. The device can use the content by receiving the CEK from a secure MMC.

As shown in FIG. 16B, Permission field has a structure 730. Since the SMRF 700 may include a plurality of Permission fields, the Number of Permissions field is positioned in front of a first Permission field. The Permission field includes the number of references to an asset ID, a reference to an asset ID, the number of permission information field, and a permission information field. At least one reference to an asset ID may be positioned before the permission information field. The reference to an asset ID indicates the asset ID included in the structure 720.

An RO may have 7 permissions: a Play permission, a Display permission, an Execute permission, a Print permission, an Export permission, a Copy permission, and a Move permission.

The Play permission indicates a right to express DRM content in an audio/video format. A DRM agent does not allow an access based on Play with respect to content such as JAVA games that cannot be expressed in the audio/video format.

The Play permission may optionally have a constraint. If a specified constraint is present, the DRM agent grants a right to Play according to the specified constraint. If no specified constraints are present, the DRM agent grants unlimited Play rights.

The Display permission indicates a right to display DRM content through a visual device. A DRM agent does not allow an access based on Display with respect to content such as gif or jpeg images that cannot be displayed through the visual device.

The Execute permission indicates a right to execute DRM content such as JAVA games and other application programs. The Print permission indicates a right to generate a hard copy of DRM content such as jpeg images.

The Export permission indicates a right to send DRM contents and corresponding ROs to a DRM system other than an open mobile alliance (OMA) DRM system or a content protection architecture. The Export permission may have a constraint. The constraint specifies a DRM system of a content protection architecture to which DRM content and its RO can be sent. The Export permission is divided into a move mode and a copy mode. When an RO is exported from a current DRM system to another DRM system, the RO is deleted from the current DRM system in the move mode but is not deleted from the current DRM system in the copy mode.

The Move permission is divided into a device-to-secure MMC move and a secure MMC-to-device move. In the device-to-secure MMC move, an RO in a device is sent to a secure MMC and the original RO in the device is deactivated. Similar operations are performed in the secure MMC-to-device move.

The Copy permission is divided into a device-to-secure MMC copy and a secure MMC-to-device copy. In the device-to-secure MMC copy, an RO in a device is sent to a secure MMC, but unlike the Move permission, the original RO in the device is not deactivated. Similar operations are performed in the secure MMC-to-device copy.

The number of permission information fields indicates the number of permissions. A permission information field contains information, such as a constraint, regarding one of the seven permissions.

The permission information field has a structure 750 including a permission index, an export index, the number of constrains, and a constraint index+constraint information. The permission index indicates a type of permission and has one of the values shown in Table 1.

TABLE 1

| Permission name | Permission index |
| --- | --- |
| All | 0x00 |
| Play | 0x01 |
| Display | 0x02 |
| Execute | 0x03 |
| Print | 0x04 |
| Export | 0x05 |
| Move | 0x06 |
| Copy | 0x07 |

The export index is used when the permission index indicates Export to identify one of an export using a copy process and an export using a move process.

The permission information field includes information regarding part or all of the constraints shown in Table 2. The constraint information restricts the consumption of digital content. Table 2 shows types of constraints. The constraint index has one of the values shown in Table 2 and indicates a type of constraint.

TABLE 2

| Constraint name | Constraint index |
|---|---|
| None | 0x00 |
| Count | 0x01 |
| Time Count | 0x02 |
| Interval | 0x03 |
| Accumulated | 0x04 |
| Datetime | 0x05 |
| Individual | 0x06 |
| System | 0x07 |

Examples of a structure of a field of the constraint index+constraint information according to a value of the constraint index will be described with reference to FIG. 17 below.

A structure 751 for a Count constraint includes a 2-byte count subfield to specify the count of permissions granted to content. A structure 752 for a Time Count constraint includes a count subfield and a timer subfield to specify the count of permissions granted to content during a period of time defined by a timer.

A structure 753 for an Interval constraint includes a time subfield having a structure 754 to specify a time interval at which an RO can be executed for corresponding DRM content. A structure 755 for an Accumulated constraint specifies a maximum time interval for an accumulated measured period of time while an RO is executed for corresponding DRM content. If the accumulated measured period of time exceeds the maximum time interval specified by the Accumulated constraint, a DRM agent does not permit access to the DRM content with respect to the RO. A structure 756 for a Datetime constraint includes two time subfields to specify a duration for a permission and selectively contains a start time or an end time. When the start time is contained, consumption of DRM content is permitted after a specified time and date. When the end time is contained, consumption of the DRM content is permitted by a specified time and date. A structure 757 for an Individual constraint specifies a person to whom DRM content is bound, for example, using a uniform resource identifier (URL) of the person. Accordingly, if a device user's identity is not identical with the identity of the person permitted to use the DRM content, a DRM agent does not permit access to the DRM content. A structure 758 for a System constraint specifies a DRM system or a content protection architecture to which content and an RO can be exported. A DRM system version subfield included in the structure 758 specifies version information of the DRM system or the content protection architecture. A DRM system subfield included in the structure 758 specifies a name of the DRM system or the content protection architecture.

Figure 17:
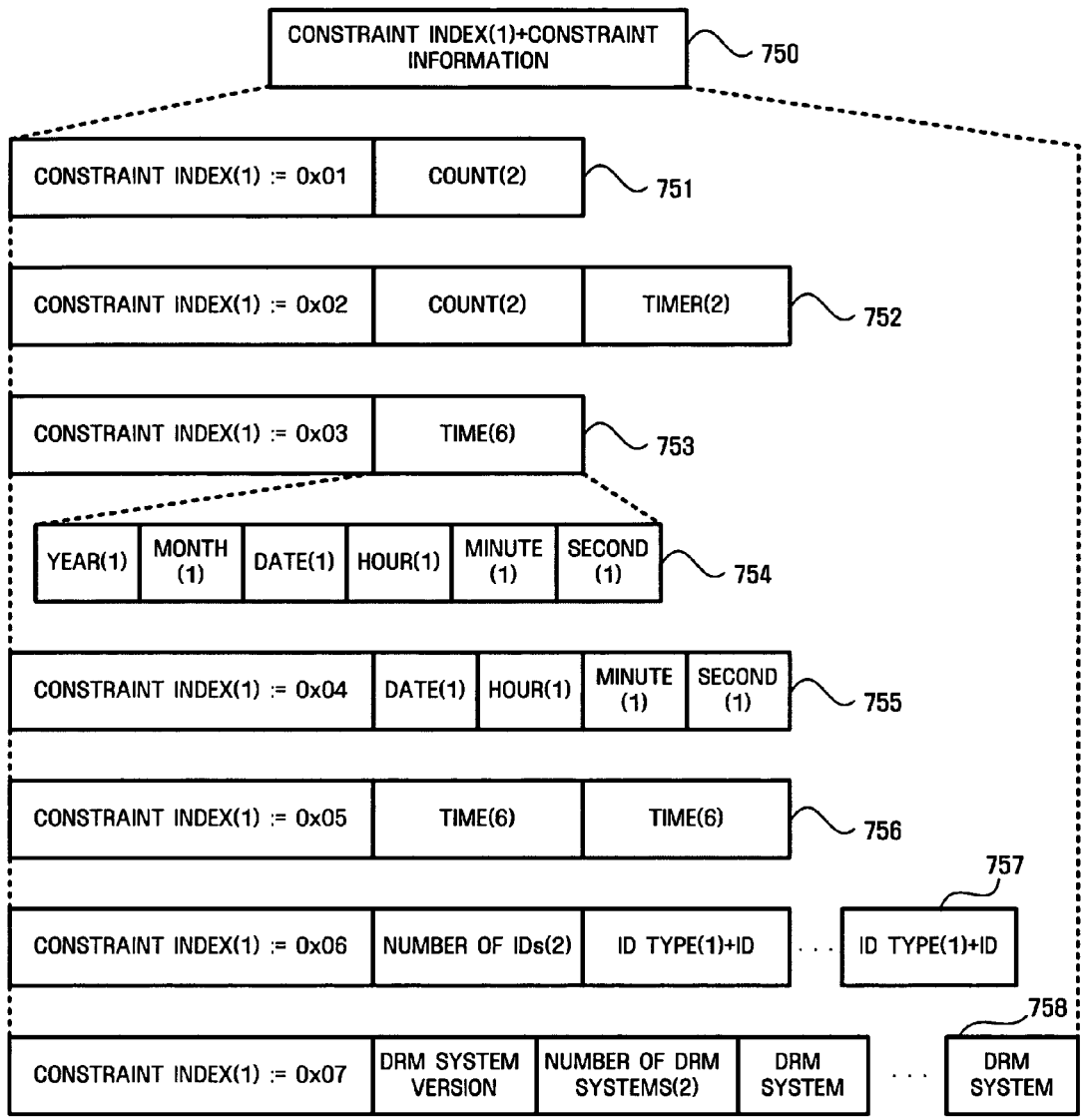
FIG. 17 illustrates a structure of constraint information according to an exemplary embodiment of the present invention.

In the field of the constraint index+constraint information shown in FIG. 17, the constraint information is changed when an RO is copied or moved. For example, when the count of RO copies is specified by the Count constraint with the structure 751, the RO can be copied or moved only the number of times corresponding to the specified count. When the count is 3, the RO can be copied or moved only three times. If the RO has been copied or moved three times, thereafter the RO cannot be copied or moved. In another example, if an RO has the Copy permission with the Time Count constraint having the structure 752 specifying that the RO can be copied up to K times during a predetermined period of time, the RO can be copied a maximum of K times only within the predetermined period of time.

The constraint information shown in FIG. 17 specifies how many times, when, or to whom an RO is permitted to be copied or moved. Accordingly, such constraint information becomes control information used to control the copy or move of an RO.

During the copy or move of an RO, the constraint information, i.e., control information for the RO is changed to prevent unauthorized people from copying or moving the RO. In addition, since the RO is not copied or moved when a particular time or count restricted by DRM has been expired, the RO can be efficiently managed. How the control information is changed when an RO is copied will be described as an example.

FIGS. 18A and 18B illustrate an example of changes in constraint information, i.e., control information having the structure illustrated in FIG. 17. As shown in FIG. 18A, constraint information contains Count indicating the available number of copies and Datetime indicating a duration during which an RO can be copied. The constraint information appears before the RO is copied, that is, the constraint information is for an original RO. According to the constraint information, the RO can be copied up to three times during a predetermined duration. Comparing the constraint information in FIG. 18A with constraint information in FIG. 18B appearing after the RO is copied, a value of the Count is decreased by 1 after the RO is copied. Meanwhile, the Datetime in the constraint information in FIG. 18A before RO is copied has 2004-03-12T10:23:00 as a start value and 2004-04-12T21:23:00 as an end value. Accordingly, the RO can be copied within a duration from 10:23:00 on Mar. 12, 2004 to 21:23:00 on Apr. 12, 2004. The RO cannot be copied outside of the duration. Similar constraint information can be set for the move of the RO. For the move of the RO, the number of times the RO can be moved and a duration during which the RO can be moved may be set.

The constraint information, i.e., control information shown in FIG. 17 may be differently configured. For clarity of the description, the control information is expressed in XML, which allows a user to extend a markup. In other words, the user can define a structure of a document or data and configure the data according to the defined structure. Such a data defining method is used in many standards. For example, XML is used to define OMA rights expression language (OREL) which is language used to express a right for DRM in the OMA. In the XML, an element is defined and a structure of data contained in the element is also configured using elements. FIG. 19 illustrates a structure of constraint information according to another embodiment of the present invention. The constraint information shown in FIG. 19 contains the count of copies, difference between generations, a duration during which copying is permitted, etc.

Referring to FIG. 19, TIME and COUNT elements are present within an element COPY_CONTROL_INFO. The TIME element gives temporal restriction to the copy. Instants of time respectively defined at START and END in the TIME element are considered, and the copy is permitted when the temporal restriction is satisfied. After the copy, such control information regarding the temporal restriction for the copy does not need changing for an original RO and a copied RO.

The COUNT element gives generational restriction to the copy. The COUNT element has more information than the TIME element since it must contain control information for each copy. The COUNT element needs a total of 4 elements. Firstly, a MYGEN element indicates whether a current RO is original or a copy and if the current RO is a copy, indicates how many generations are present from the original RO to the current RO. The generation indicates how many copies have been done before the current RO. For example, the generation of the original RO may be set to 1, and the generation of an RO copied from the original RO may be set to 2. In this case, when a value of MYGEN of the current RO is "n," a value of MYGEN of an RO copied from the current RO will be "n+1." An ACCEPT_GEN element has information regarding a generation at which copying is permitted. When a value of the MYGEN exceeds a value of ACCEPT_GEN, copying is not permitted. A NUM element indicates the number of times that the current RO can be copied. When a value of the NUM is 0, the current RO cannot be copied. The value of the NUM is decreased by 1 whenever copying is performed. A COPYGEN_INFO element has information regarding the number of copies of an RO permitted at each generation. COPYGEN_INFO includes a GEN and a GENNUM. GEN is information regarding a generation and GENNUM indicates the number of copies permitted at the generation. Consequently, copying is performed only when both of the temporal restriction given by the TIME and the restriction given by the COUNT are satisfied.

FIGS. 20A, 20B and 20C illustrate an example of changes in constraint information having the structure illustrated in FIG. 19 when an RO is copied. As shown in FIG. 20A, constraint information for an original RO before copying includes <MYGEN>1/<MYGEN> indicating that the generation of a current RO, i.e., the original RO is 1. Since a value of ACCEPT_GEN is 3, copying is permitted at generation 1. Since NUM has a value of 5, afterwards five copies of the current RO can be generated. COPYGEN_INFO contains copy information for all generations of the RO. The number of copies permitted at each generation is stored in COPYGEN_INFO and is needed to generate constraint information for a copied RO. GEN indicates generation and GENNUM indicates the number of copies permitted at the generation. Since GENNUM is 4 when GEN is 2, an RO copied from the original RO can be copied four times which is expressed in constraint information for a copied RO after copying as shown in FIG. 20B. When the original RO is copied successfully, the constraint information (a) is changed into constraint information (b) for the original RO after copying. With reference to FIG. 20B, the constraint information for the original RO after copying, NUM has a value of 4, which is obtained by decreasing 5 by 1, and GENNUM in the COPYGEN_INFO also has a changed value. Here, the constraint information is expressed in XML for clarity of the description but is converted to be suitable for an RO structure and file formats of a device and a portable storage device.

Figure 21:
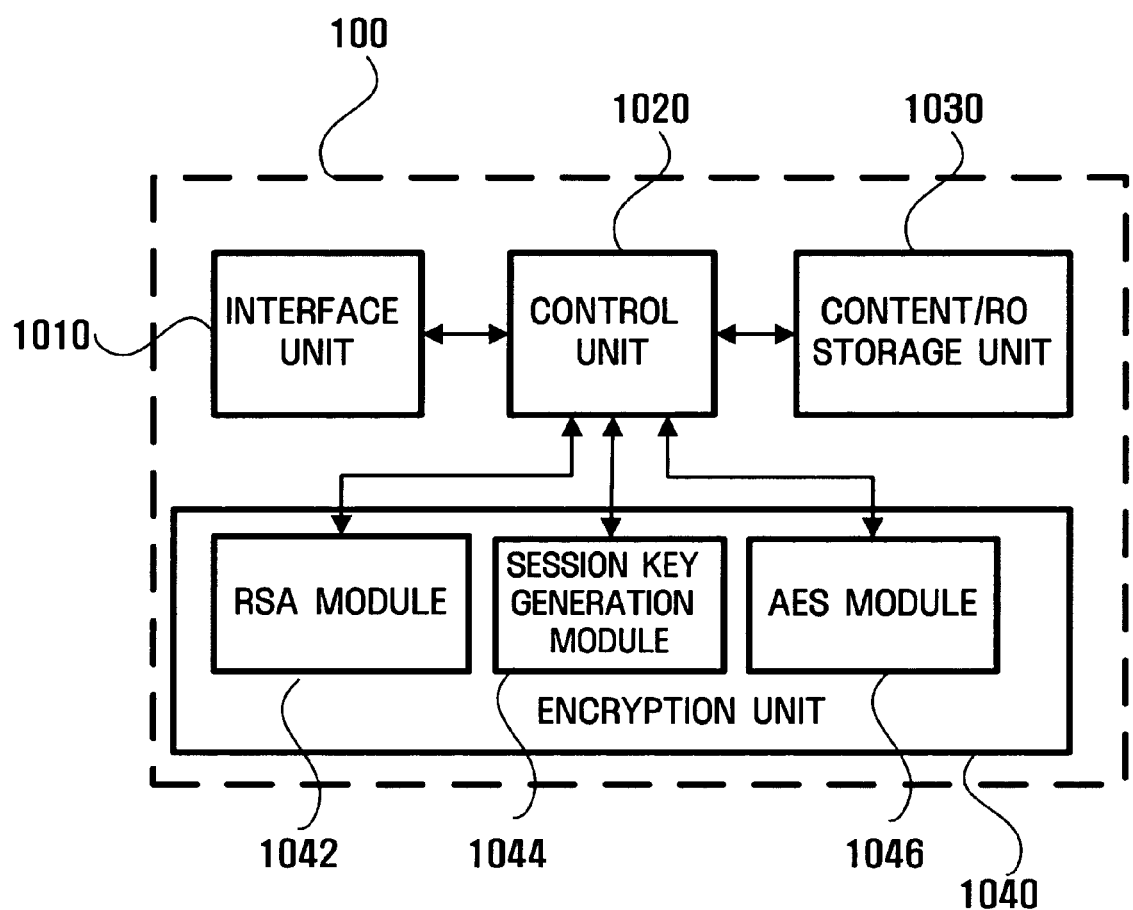
FIG. 21 is a functional block diagram of a secure MMC according to an exemplary embodiment of the present invention.

FIG. 21 is a functional block diagram of a secure MMC 100 according to an exemplary embodiment of the present invention.

In the exemplary embodiment, the term 'unit' is limited to hardware components, and the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

To implement DRM, the secure MMC 100 needs a security function, a function of storing content or an RO, a function of exchanging data with a device, and a DRM function. To perform these functions, the secure MMC 100 includes an encryption unit 1040 for the security function, the encryption unit 1040 having an RSA module 1042, a session key generation module 1044, and an AES module 1046, a content/RO storage unit 1030 with a storage function, an interface unit 1010 allowing data exchange with the device, and a control unit 1020 controlling each module to perform a DRM procedure.

The control unit 1020 converts an RO into a file with a format suitable for the device and changes information of the RO before transmitting the RO to the device. The RO is converted when an RO structure stored in the device is different from that stored in a portable storage device, i.e., the secure MMC 100, so that the device can recognize the RO. In addition, the control unit 1020 enables applications stored in the secure MMC 100 to operate.

The interface unit 1010 allows the secure MMC 100 to be connected with the device. When the secure MMC 100 is connected with the device, the interface unit 1010 of the secure MMC 100 may be electrically connected with an interface unit of the device. However, the electrical connection is just an example, and the connection may indicate a state in which the secure MMC 100 can communicate with the device through a wireless medium without a contact.

The RSA module 1042 performs public-key encryption. More particularly, the RSA module 1042 performs RSA encryption according to a request from the control unit 1020. In embodiments of the present invention, during mutual authentication, the RSA encryption is used for key (random number) exchange or digital signature. However, the RSA encryption is just an example, and other public-key encryption may be used.

The session key generation module 1044 generates a random number to be transmitted to the device and generates a session key using a random number received from the device and the generated random number. The random number generated by the session key generation module 1044 is encrypted by the RSA module 1042 and then transmitted to the device through the interface unit 1010. Meanwhile, instead of generating the random number in the session key generation module 1044, the random number may be selected from a plurality of random numbers provided in advance.

The AES module 1046 performs symmetric-key encryption using the generated session key. More particularly, the AES module 1046 uses AES encryption to encrypt a content encryption key from an RO with the session key and to encrypt other important information during communication with the device. The AES encryption is just an example, and other symmetric-key encryption such as DES encryption may be used.

The content/RO storage unit 1030 stores encrypted contents and ROs. The secure MMC 100 encrypts an RO according to the AES encryption using a unique key that cannot be read by the device, and decrypts the RO using the unique key to allow the RO to be moved or copied to the device. The encrypting of an RO using the unique key according to the symmetric-key encryption is just an example. Alternatively, an RO may be encrypted using a private key of the secure MMC 100 and may be decrypted using a public key of the secure MMC 100 when necessary.

Figure 22:
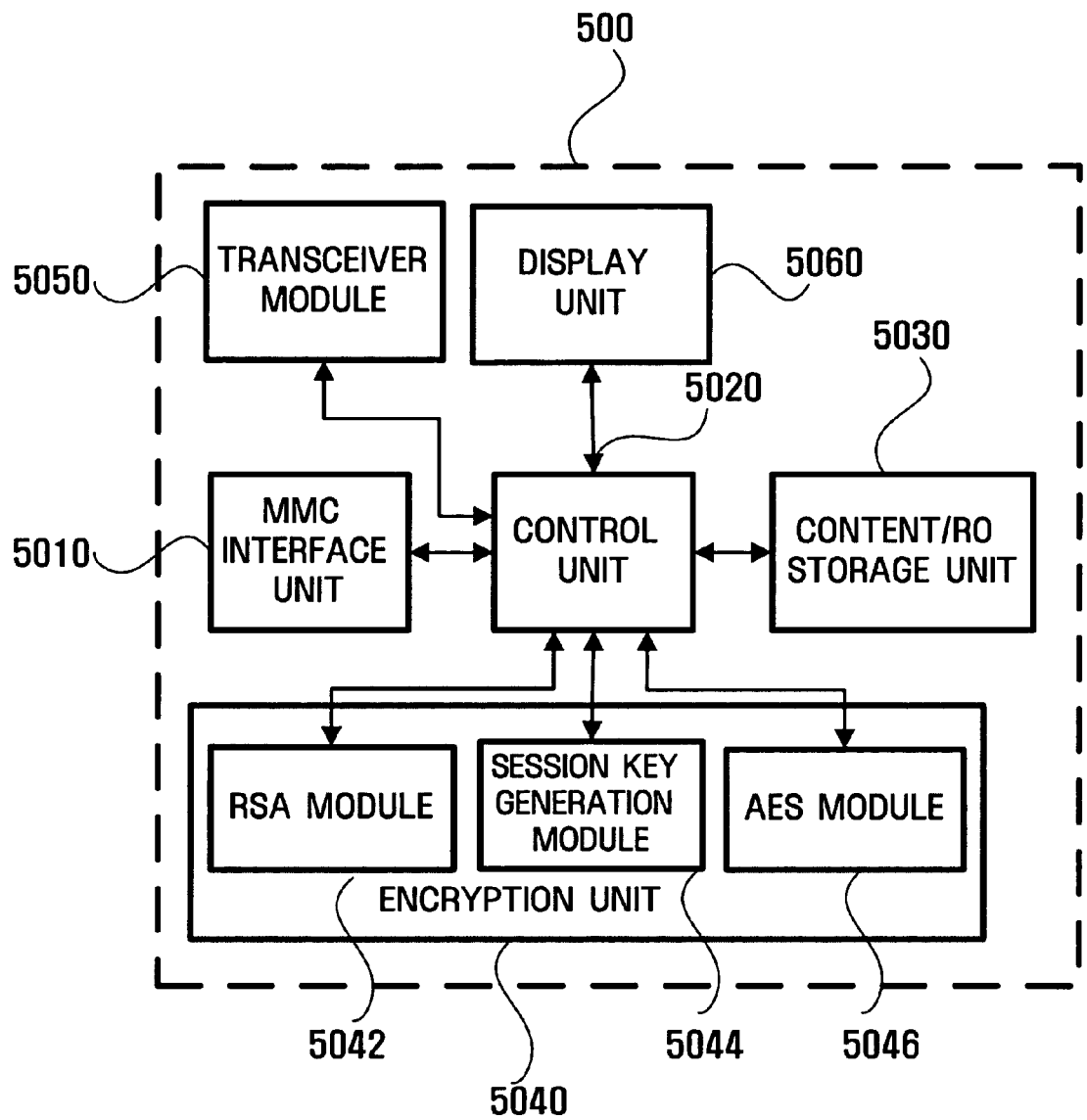
FIG. 22 is a functional block diagram of a device according to an exemplary embodiment of the present invention.

FIG. 22 is a functional block diagram of a device 500 according to an embodiment of the present invention.

To implement DRM, the secure MMC 500 needs a security function, a function of storing content or an RO, a function of exchanging data with a device, and a DRM function. To perform these functions, the secure MMC 500 includes an encryption unit 5040 for the security function, the encryption unit 5040 having an RSA module 5042, a session key generation module 5044, and an AES module 5046, a content/RO storage unit 5030 with a storage function, an interface unit 5010 allowing data exchange with the device, and a control unit 5020 controlling each module to perform a DRM procedure.

The control unit 5020 converts an RO into a file with a format suitable for the device and changes information of the RO before transmitting the RO to the device. The RO is converted when an RO structure stored in the device is different from that stored in a portable storage device, i.e., the secure MMC 500, so that the device can recognize the RO. In addition, the control unit 5020 enables applications stored in the secure MMC 500 to operate.

The interface unit 5010 allows the secure MMC 500 to be connected with the device. When the secure MMC 500 is connected with the device, the interface unit 5010 of the secure MMC 500 may be electrically connected with an interface unit of the device. However, the electrical connection is just an example, and the connection may indicate a state in which the secure MMC 500 can communicate with the device through a wireless medium without a contact.

The RSA module 5042 performs public-key encryption. More particularly, the RSA module 5042 performs RSA encryption according to a request from the control unit 5020. In embodiments of the present invention, during mutual authentication, the RSA encryption is used for key (random number) exchange or digital signature. However, the RSA encryption is just an example, and other public-key encryption may be used.

The session key generation module 5044 generates a random number to be transmitted to the device and generates a session key using a random number received from the device and the generated random number. The random number generated by the session key generation module 5044 is encrypted by the RSA module 5042 and then transmitted to the device through the interface unit 5010. Meanwhile, instead of generating the random number in the session key generation module 5044, the random number may be selected from a plurality of random numbers provided in advance.

The AES module 5046 performs symmetric-key encryption using the generated session key. More particularly, the AES module 5046 uses AES encryption to encrypt a content encryption key from an RO with the session key and to encrypt other important information during communication with the device. The AES encryption is just an example, and other symmetric-key encryption such as DES encryption may be used.

The content/RO storage unit 5030 stores encrypted contents and ROs. The secure MMC 500 encrypts an RO according to the AES encryption using a unique key that cannot be read by the device, and decrypts the RO using the unique key to allow the RO to be moved or copied to the device. The encrypting of an RO using the unique key according to the symmetric-key encryption is just an example. Alternatively, an RO may be encrypted using a private key of the secure MMC 500 and may be decrypted using a public key of the secure MMC 500 when necessary.

The display unit 5060 visually displays playback of content whose RO permits playback. The display unit 5060 may be implemented by a liquid crystal display (LCD) device such as a thin-film transistor (TFT) LCD device or an organic electroluminescent (EL) display device.

Examples of instructions used for moving an RO illustrated in FIGS. 6 and 7 and copying an RO illustrated in FIGS. 8 and 9 will be described below.

Command is comprised of an input command and an output response. A device transmits the input command with an instruction to a secure MMC and receives data or a result of executing the instruction from the secure MMC through the output response. Accordingly, every command has the input command, which is transmitted from a device to a secure MMC, and data or a result value corresponding to the input command is transmitted from the secure MMC to the device through the output response. The instruction is an example of an APDU.

Description of elements included in an input command will now be set forth.

CLA and INS are information for transmission of an instruction. The instruction included in the input command may be recognized as SET_MOVE_RO based on a combination of P1 and P2, which may vary. For example, when the P1 is 01, the instruction may be recognized relating to move and may be determined as one of SET_MOVE_RO and GET_MOVE_RO by P2. Accordingly, the instructions described with reference to FIGS. 6 through 9 can be distinguished from one another by the combination of P1 and P2.

Lc and Le indicate whether a data field contains information. When a device transmits an input command with a data field containing information to a secure MMC, Lc and Le have values "FFh" and "00h," respectively. However, when the device sends an input command to request the secure MMC to transmit particular data, no information is contained in the data field. Accordingly, Lc and Le have values "00h" and "FFh," respectively, to indicate that no data is stored in the data field. However, values of the fields of instructions included in the input command may vary.

The output response is used by the secure MMC receiving the input command to transmit a result value or data. When the device requests a certain data value, information may be stored in the data field. Meanwhile, a result of the secure MMC receiving the input command from the device is expressed by two status values SW1 and SW2 of a status word. The status word may indicate one of two cases where the input command from the device is successfully received and processed by the secure MMC and where an error occurs in a tag value. According to the status word received from the secure MMC, the device can recognize whether the secure MMC has successfully received an APDU containing the command information. When the status values SW1 and SW2 are "90h" and "00h," respectively, the command information has been successfully received. When the status values SW1 and SW2 are "6Dh" and "00h," respectively, tag is unknown. When the status values SW1 and SW2 are "6Bh" and "00h," respectively, a parameter value has an error. When the status values SW1 and SW2 are "69h" and "85h," respectively, reauthentication is required since an access has been performed without authentication or there has been a problem in authentication. The output response reports whether values of the input command have been properly received by the secure MMC but does not report whether the input command has been properly processed by the secure MMC. To obtain information on whether the input command has been properly processed by the secure MMC, an independent instruction GET_CONFIRM is used.

FIGS. 23A and 23B illustrate a structure of a SET_MOVE_RO command used in operation S230 shown in FIG. 6. As shown in FIG. 23A, since the SET_MOVE_RO command transmits an RO from a device to a secure MMC, the Lc and Le have values of "FFh" and "00h," respectively. The P1 and P2 may have predetermined values to indicate that an instruction is SET_MOVE_RO. This characteristic of the P1 and P2 is applied to other instructions. Thus, descriptions of the P1 and P2 will be omitted when other instructions are described below. A data field in an input command includes information necessary for transmission of the RO. The information contains AppendInfo, SSC, ROType, and SMRF values and selectively contains an ORO, which have been described with reference to FIG. 6. The information is encrypted using a session key and then transmitted.

As shown in FIG. 23B, an output response from the secure MMC responding to the input command can be recognized by a status value indicating success or failure. The output response is not a value resulting from execution of the instruction but indicates whether the secure MMC has properly received an APDU containing the instruction. The status value has been described above.

FIGS. 24A and 24B illustrate a structure of a GET_CONFIRM command used in operation S240 shown in FIG. 6. As shown in FIG. 24A, when the move is completed, information on a result of executing the instruction can be obtained from the secure MMC using the GET_CONFIRM command, which includes an SSC and an ACK. Since an instruction GET_CONFIRM is used by the device to receive particular data from the secure MMC, Lc and Le have the values "00h" and "FFh," respectively. The P1 and P2 may have predetermined values to indicate that the instruction is GET_CONFIRM. A data field in an input command contains no values since the device requests data. As shown in FIG. 24B, an output response from the secure MMC responding to the input command can be recognized by a data value indicating a result of the move, i.e., whether the move has succeeded and a status value indicating whether the input command has been properly received by the secure MMC. The data value includes an ACK value and an SSC value that have been encrypted and is transmitted to the device. The status value has been described above.

FIGS. 25A and 25B illustrate a structure of a SET_SELECT_RO command used in operation S330 shown in FIG. 7 and in operation S530 shown in FIG. 7. This command is used to transmit an RID, i.e., an ID of an RO to be copied or moved and is needed to move or copy the RO from a secure MMC to a device. As shown in FIG. 25A, encrypted values of an SSC and RID are stored in a data field of an input command, which is transmitted from the device to the secure MMC. Since particular data is transmitted from the device to the secure MMC, Lc and Le have the values "FFh" and "00h," respectively. As shown in FIG. 25B, an output response to the input command includes a value indicating whether the input command has been properly received by the secure MMC and can be recognized by a combination of SW1 and SW2 values.

FIGS. 26A and 26B illustrate a structure of a GET_MOVE_RO command used in operation S340 shown in FIG. 7. In this command, an RO to be moved is transmitted as a value of a data field. Since data is transmitted from a secure MMC to a device, the P1 and P2 in an input command indicate that an instruction is GET_MOVE_RO. The RO to be moved is encrypted and stored in the data field of an output response, which is transmitted from the secure MMC to the device.

FIGS. 27A and 27B illustrate a structure of a SET_CONFIRM command used in operation S350 shown in FIG. 7 and in operation S550 shown in FIG. 9. This command is used to inform a secure MMC of success or failure of move or copy. A data field in an input command includes an SSC value and an ACK value as parameters. When the secure MMC is informed of the success, the secure MMC changes information regarding an original RO that is an object of a copy or move. Lc and Le in the input command and the SW1 and SW2 in an output response are the same as those described above.

FIGS. 28A and 28B illustrate a structure of a SET_COPY_RO command used in operation S410 shown in FIG. 8. In this command, since an RO is transmitted from a device to a secure MMC, Lc and Le have the values "FFh" and "00h," respectively. P1 and P2 may have predetermined values to indicate that an instruction is SET_COPY_RO. A data field in an input command includes information necessary for transmission of the RO. The information contains SSC and SMRF values. The information is encrypted using a session key and then transmitted.

An output response from the secure MMC responding to the input command can be recognized by a status value indicating success or failure. The output response is not a value resulting from execution of the instruction but indicates whether the secure MMC has properly received an APDU containing the instruction. The status value has been described above.

FIGS. 29A and 29B illustrate a structure of a GET_COPY_RO command used in operation S540 shown in FIG. 9. In this command, an RO to be copied is transmitted as a value of a data field. Since data is transmitted from a secure MMC to a device, P1 and P2 in an input command indicate that an instruction is GET_COPY_RO. The RO to be copied is encrypted and stored in the data field of an output response, which is transmitted from the secure MMC to the device.

FIGS. 30A through 34E show examples of values that parameters have when commands are implemented.

FIGS. 30A through 30E show examples of parameters of an instruction SET_MOVE_RO. As shown in FIGS. 30A, 30B and 30C, instruction SET_MOVE_RO includes a header field and a data field. The header field contains information identifying an instruction and the data field contains information regarding the instruction. A P1 field in the header field has a value indicating the instruction SET_MOVE_RO. A T-field in the data field is a tag field having a tag value indicating the instruction SET_MOVE_RO. An L-field in the data field has a value indicating a length of a V-field in the data field. The V-field has an encrypted value of an RO to be moved.

The instruction SET_MOVE_RO transmits an encrypted RO to a secure MMC, and therefore, an output response to this instruction has no values in its T-, L- and V-fields, as shown in FIG. 30D. A status word in the output response includes information on a result of executing the instruction SET_MOVE_RO.

The status word is expressed by a combination of SW1 and SW2 indicating one of "successful execution of the instruction (or successful transmission)", "unknown tag", "wrong parameter in the V-field", "general authentication needed", "authentication needed", "verification failure", and "number of attempts", as shown in FIG. 30E. A status word having a value indicating "successful execution of the instruction (or successful transmission)" corresponds to a normal response, and a status word having a value indicating "verification failure" corresponds to an abnormal response.

FIGS. 31A through 31E show examples of parameters of an instruction GET_MOVE_RO which have a similar format as those of the instruction SET_MOVE_RO. A P1 field in a header field has a value indicating the instruction GET_MOVE_RO. Since the instruction GET_MOVE_RO requests transmission of an RO that has been selected by a user of a device, a data field of the instruction GET_MOVE_RO has no values.

A data field in an output response has an encrypted value of the RO, the moving of which has been requested. A status word in the output response includes information on a result of executing the instruction. A T-field in the data field is a tag field having a tag value indicating a response to the instruction GET_MOVE_RO. An L-field has a value indicating a length of a V-field. The V-field has the encrypted value of the RO.

A status word is expressed by a combination of SW1 and SW2 indicating one of "successful execution of the instruction", "unknown tag", "wrong parameter in the V-field", "general authentication needed," and "authentication needed".

FIGS. 32A through 32E show examples of parameters of an instruction SET_COPY_RO. Parameters CLA and INS do not specify an instruction but specify a group of instructions having similar properties. Accordingly, the two instructions SET_COPY_RO and GET_COPY_RO related to copying have the same CLA and INS values. A group of instructions related to copying has a value "00" as the CLA and a value "74" as the INS. The instruction SET_COPY_RO is distinguished from the other instructions related to copying by parameters P1 and P2. An RO to be copied is encrypted and stored in a data field in the instruction SET_COPY_RO, which is transmitted to a portable storage device. When the data field contains data, parameters Lc and Le have values "FF" and "00," respectively. When the data field contains no data, Lc and Le have values "00" and "FF," respectively. Since the instruction SET_COPY_RO has data in the data field, Lc and Le have values "FF" and "00," respectively. The data field includes a tag (T), length (L) and value (V) fields. The encrypted RO is set in the V-field and transmitted. In response to the instruction SET_COPY_RO, the portable storage device uses a status word as a response. As shown in FIG. 32E, the status word is comprised of SW1 and SW2 to indicate whether copying has succeeded, whether data in the tag value has errors, whether an error is in the V-field, whether authentication is needed, and whether a reattempt of copying is possible when an error occurs during copying.

FIGS. 33A through 33E show examples of parameters of an instruction GET_COPY_RO for copying an RO from a portable storage device to a device. Since the instruction GET_COPY_RO is a copy instruction, it has the same CLA and INS values as the instruction SET_COPY_RO and is distinguished from the instruction SET_COPY_RO by P1 and P2 values. As described above, when there is no data in a data field, Lc and Le values are "FF" and "00," respectively. When the data field contains data, the Lc and Le values are "00" and "FF," respectively. Since the instruction GET_COPY_RO does not have data in the data field, the Lc and Le values are "00" and "FF," respectively. An RO stored in the portable storage device is encrypted and set in a data field in a response and transmitted together with SW1 and SW2 values indicating information on whether the instruction has been executed successfully.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

According to the present invention, moving and copying of digital works can be controlled. Since control information for moving and copying is specified, the digital works can be prevented from being recklessly and randomly copied and moved, and therefore, copyright can be protected.

In addition, since a sequence number is allocated to an instruction, data loss or unauthorized access can be prevented.

Furthermore, since mutual authentication is performed between a device and a portable storage device, information of a digital work is prevented from being revealed during transmission, and therefore, copyright can be protected.

What is claimed is:

1. A method of moving a rights object from a device to a portable storage device, the method comprising:
   decrypting the rights object using a unique key of the device before converting the rights object;
   converting a format of the rights object supported by the device into a format of the rights object supported by the portable storage device using the device to generate a converted rights object;
   allocating a sequence number to the rights object;
   encrypting the converted rights object using the device to generate an encrypted rights object after the allocating sequence number;
   transmitting the encrypted rights object from the device to the portable storage device; and
   deactivating the rights object stored in the device and maintaining the rights object stored in the device to be able to be reactivated again if the transmitting the encrypted rights object is completed,
   wherein the format of the rights object supported by the portable storage device is a binary stream format, the format of the rights object supported by the device is a text format, the rights object has a limited license to access digital contents, and the rights object is dividable into two or more portions for the format conversion when the rights object is being converted.

2. The method of claim 1, further comprising selecting the rights object before converting the rights object.

3. The method of claim 1, wherein the encrypting of the converted rights object comprises encrypting the rights object using a key generated as a result of mutual authentication between the device and the portable storage device.

4. The method of claim 1, wherein the deactivating the rights object comprises:
   deactivating the rights object if a normal response is not received from the portable storage device within a predetermined period of time or if an abnormal response is received; and
   reporting that the moving the rights object is terminated abnormally.

5. A method of moving a rights object, the method comprising:
   requesting a portable storage device to move the rights object using a device;
   receiving an encrypted rights object from the portable storage device;
   decrypting the encrypted rights object at the device and storing the rights object which has been decrypted in the device; and
   deactivating the rights object stored in the portable storage device and maintaining the rights object stored in the portable storage device to be able to be reactivated again,
   wherein the decrypting of the encrypted rights object comprises decrypting the encrypted rights object to generate a decrypted rights object, encrypting the decrypted rights object using a unique key of the device to generate a further encrypted rights object, and storing the further encrypted rights object in the device, and wherein the received rights object has a sequence number allocated thereto, and wherein the received rights object is converted into a format supported by the device from a format supported by the portable storage device, the format supported by the portable storage device is a binary stream format, the format of the rights object supported by the device is a text format, the rights object has a limited license to access digital contents, and the rights object is dividable into two or more portions for the format conversion when the rights object is being converted.

6. The method of claim 5, further comprising selecting the rights object to be encrypted before requesting the portable storage device to move the rights object.

7. The method of claim 5, wherein the decrypting the encrypted rights object comprises decrypting the encrypted rights object using a key generated as a result of mutual authentication between the device and the portable storage device.

8. The method of claim 5, further comprising deactivating the rights object stored in the device and reporting that the moving of the rights object is terminated abnormally, if the moving of the rights object is not normally completed.

9. A method of moving a rights object, the method comprising:

performing mutual authentication between a portable storage device and a device to generate an encryption key;

receiving the rights object encrypted using the encryption key;

decrypting and storing the rights object which was received; and deactivating the rights object which was received if the moving of the rights object is not normally terminated and maintaining the deactivated rights object to be able to be reactivated again, wherein the received rights object has a sequence number allocated thereto, and wherein the received rights object is converted into a format supported by the device from a format supported by the portable storage device, the format supported by the portable storage device is a binary stream format, the format of the rights object supported by the device is a text format, the rights object has a limited license to access digital contents, and the rights object is dividable into two or more portions for the format conversion when the rights object is being converted.

10. The method of claim 9, wherein the rights object which was received is decrypted using the encryption key.

11. The method of claim 9, further comprising transmitting a normal response to the device after storing the rights object which was received.

12. A method of moving a rights object from a portable storage device to a device, the method comprising:

receiving a request to move the rights object from the device using the portable storage device;

decrypting the rights object using a unique key of the portable storage device before converting of the rights object;

converting the rights object into a format supported by the device in response to the request to generate a converted rights object;

allocating a sequence number to the received rights object;

encrypting the converted rights object to generate an encrypted rights object after the allocating the sequence number;

transmitting the encrypted rights object from the portable storage device to the device; and deactivating the rights object stored in the portable storage device and maintaining the rights object stored in the portable storage device to be able to be reactivated again if the transmitting the encrypted rights object is completed, wherein the format of the rights object supported by the portable storage device is a binary stream format, a format of the rights object supported by the device is a text format, the rights object has a limited license to access digital contents, and the rights object is dividable into two or more portions for the format conversion when the rights object is being converted.

13. The method of claim 12, wherein the encrypting the converted rights object comprises encrypting the rights object using a key generated as a result of mutual authentication between the device and the portable storage device.

14. A portable storage device comprising:

an interface unit which connects a portable storage device to a device;

a control unit which converts a format of a rights object that is transmitted to the device or received from the device through the interface unit and deactivates a rights object that has been completely moved and maintains the deactivated rights object to be able to be reactivated again, wherein the transmitted or received rights object has a sequence number allocated thereto; and a symmetric-key encryption unit which encrypts or decrypts the rights object converted by the control unit, wherein the control unit generates the sequence number and compares sequence numbers, and wherein a format of the rights object supported by the portable storage device is a binary stream format, a format of the rights object supported by the device is a text format, the rights object has a limited license to access digital contents, and the rights object is dividable into two or more portions for the format conversion when the rights object is being converted.

15. The portable storage device of claim 14, wherein the rights object is encrypted or decrypted using a session key generated by a session key generation module.

16. A device comprising:

an interface unit which connects the device to a portable storage device;

a control unit which converts a format of a rights object that is transmitted to the portable storage device or received from the portable storage device through the interface unit and deactivates the rights object that has been completely moved and maintains the rights object to be able to be reactivated again, wherein the transmitted or received rights object has a sequence number allocated thereto; and a symmetric-key encryption unit which encrypts or decrypts the rights object converted by the control unit, wherein the control unit generates the sequence number and compares sequence numbers, and wherein a format of the rights object supported by the portable storage device is a binary stream format, a format of the rights object supported by the device is a text format, the rights object has a limited license to access digital contents, and the rights object is dividable into two or more portions for the format conversion when the rights object is being converted.

17. The device of claim 16, wherein the rights object is encrypted or decrypted using a session key generated by a session key generation module.

18. A method of copying a rights object from a device to a portable storage device, the method comprising:
encrypting the rights object which is stored in the device using a common encryption key;
embedding the encrypted rights object into a signal to be transmitted to the portable storage device; and
transmitting the signal containing the rights object from the device to the portable storage device,
wherein the encrypting the rights object comprises:
decrypting the rights object that has been encrypted using a unique key of the device and is stored in the device;
converting the rights object which has been decrypted into a format supported by the portable storage device;
allocating a sequence number to the rights object; and
encrypting the rights object which has been converted using the common encryption key after the allocating the sequence number,
wherein the format of the rights object supported by the portable storage device is a binary stream format, a format of the rights object supported by the device is a text format, the rights object has a limited license to access digital contents, and the rights object is dividable into two or more portions for the format conversion when the rights object is being converted.

19. The method of claim 18, further comprising performing mutual authentication between the device and the portable storage device using a public-key scheme to generate the common encryption key before encrypting the rights object.

20. The method of claim 18, wherein the rights object has copy control information, and the copy control information for the rights object stored in the device is changed after the transmitting the signal.

21. A method of copying a rights object from a portable storage device to a device, the method comprising:
receiving a request to copy the rights object from the device;
encrypting the rights object stored in the portable storage device using a common encryption key in response to the request;
embedding the rights object which has been encrypted into a response signal corresponding to the request; and
transmitting the response signal from the portable storage device to the device,
wherein the encrypting of the rights object comprises:
decrypting the rights object that has been encrypted using a unique key of the portable storage device and stored in the portable storage device;
converting the rights object which has been decrypted into a file format supported by the device from a file format supported by the portable storage device; and
encrypting the rights object which has been converted using the common encryption key,
wherein the rights object embedded in the response signal has a sequence number allocated thereto, the file format of the rights object supported by the portable storage device is a binary stream format, the file format of the rights object supported by the device is a text format, the rights object has a limited license to access digital contents, and the rights object is dividable into two or more portions for the format conversion when the rights object is being converted.

22. The method of claim 21, further comprising performing mutual authentication between the device and the portable storage device using a public-key scheme to generate the common encryption key before encrypting the rights object.

23. The method of claim 21, wherein the rights object has copy control information, and the copy control information for the rights object stored in the portable storage device is changed after the transmitting the response signal.

24. A device comprising:
an encryption unit which encrypts a rights object, which is stored in the device, using a common encryption key to generate an encrypted rights object;
a control unit which embeds the encrypted rights object into a signal to be transmitted to a portable storage device; and
a transmitter which transmits the signal containing the encrypted rights object,
wherein the encryption unit decrypts the rights object that has been encrypted using a unique key of the device and stored in the device, the control unit converts the rights object which has been decrypted into a format supported by the portable storage device, and the encryption unit encrypts the rights object which has been converted using the common encryption key,
wherein the encrypted rights object has a sequence number allocated thereto,
wherein the control unit generates the sequence number and compares sequence numbers and
wherein the format of the rights object supported by the portable storage device is a binary stream format, a format of the rights object supported by the device is a text format, the rights object has a limited license to access digital contents, and the rights object is dividable into two or more portions for the format conversion when the rights object is being converted.

25. The device of claim 24, wherein the encryption unit generates the common encryption key using a public-key scheme.

26. The device of claim 24, wherein the rights object has copy control information, and the control unit changes the copy control information for the rights object stored in the device after the transmitter transmits the signal containing the rights object.

27. A portable storage device comprising:
a receiver which receives a request to copy a rights object from a device;
an encryption unit which encrypts the rights object, which is stored in the portable storage device, using a common encryption key in response to the request;
a control unit which embeds the rights object which has been encrypted into a response signal corresponding to the request; and
a transmitter which transmits the response signal to the device,
wherein the encryption unit decrypts the rights object that has been encrypted using a unique key of the portable storage device and stored in the portable storage device, the control unit converts the rights object which has been decrypted into a format supported by the device from a format supported by the portable storage device, and the encryption unit encrypts the rights object which has been converted using the common encryption key, and
wherein the rights object embedded in the response signal has a sequence number allocated thereto, the format of the rights object supported by the portable storage device is binary stream format, the format of the rights objected supported by the device is a text format, the rights object has a limited license to access digital contents, and the rights object is dividable into two or more portions for the format conversion when the rights object is being converted.

28. The portable storage device of claim 27, wherein the rights object has copy control information, and the control unit changes the copy control information for the rights object stored in the portable storage device after the transmitter transmits the response signal containing the rights object.

* * * * *